US009314697B2

(12) United States Patent
Levi et al.

(10) Patent No.: US 9,314,697 B2
(45) Date of Patent: Apr. 19, 2016

(54) SYSTEM AND METHOD FOR ADVERTISING DISTRIBUTION THROUGH MOBILE SOCIAL GAMING

(71) Applicant: Blue Calypso, LLC, Dallas, TX (US)

(72) Inventors: Andrew E. Levi, Plano, TX (US); Jean Pierre dela Valdene, Dallas, TX (US); William Rushing, Carrollton, TX (US); Bradley W. Bauer, Richardson, TX (US)

(73) Assignee: Blue Calypso, LLC, Richardson, TX (US)

( * ) Notice: Subject to any disclaimer, the term of this patent is extended or adjusted under 35 U.S.C. 154(b) by 278 days.

(21) Appl. No.: 14/042,319

(22) Filed: Sep. 30, 2013

(65) Prior Publication Data

US 2015/0031449 A1    Jan. 29, 2015

Related U.S. Application Data

(60) Provisional application No. 61/859,107, filed on Jul. 26, 2013.

(51) Int. Cl.
*A63F 13/30* (2014.01)
*A63F 13/216* (2014.01)
(Continued)

(52) U.S. Cl.
CPC .............. *A63F 13/216* (2014.09); *A63F 13/30* (2014.09); *A63F 13/61* (2014.09); *A63F 13/85* (2014.09); *A63F 2300/51* (2013.01)

(58) Field of Classification Search
CPC ... G07F 17/323; G07F 17/3237; G07F 17/34; A63F 13/216; A63F 2300/205
USPC ............................................ 463/31; 705/14.4
See application file for complete search history.

(56) References Cited

U.S. PATENT DOCUMENTS 4,850,007 A    7/1989 Marino et al.
5,333,186 A    7/1994 Gupta
(Continued)

FOREIGN PATENT DOCUMENTS

GB    2504952    2/2014
JP    2001/256388 A    9/2001
(Continued)

OTHER PUBLICATIONS

Popularmedia, Inc., Comparing Social Media Marketing Tactics: Beyond Viral Videos and Refer-a-Friend Programs, 2008, San Francisco, California.
(Continued)

*Primary Examiner* — Allen Chan
(74) *Attorney, Agent, or Firm* — Schultz & Associates, P.C.

(57) ABSTRACT

A system and method is disclosed for advertising through a social network by immersion of participants in a sponsored game. A game application for the sponsored game is developed on a server and deployed on consumer devices connected to the server. The game application operating on a consumer device, such as a smart phone, utilizes onboard GPS and camera subsystems to carry out and facilitate the game functions. A dashboard is provided for designing the game around an advertising campaign. The game application is syndicated and shared through a consumer's social network. The game is tracked by the server. Game information and rewards are delivered to participants during and after the game. In one aspect, the game involves a participant gathering digital permits prior to and during the game which are used to tag other participants. Rewards are delivered as redeemable coupons based on identifying graphical landmarks at sponsor locations.

23 Claims, 13 Drawing Sheets

(51) Int. Cl.
*A63F 13/85* (2014.01)
*A63F 13/61* (2014.01)

(56) References Cited

U.S. PATENT DOCUMENTS

| | | |
|---|---|---|
| 5,448,625 A | 9/1995 | Lederman |
| 5,852,775 A | 12/1998 | Hidary |
| 5,873,068 A | 2/1999 | Beaumont et al. |
| 5,933,811 A | 8/1999 | Angles et al. |
| 5,937,037 A | 8/1999 | Kamel et al. |
| 5,999,914 A | 12/1999 | Blinn et al. |
| 6,009,150 A | 12/1999 | Kamel |
| 6,029,141 A | 2/2000 | Bezos et al. |
| 6,032,130 A | 2/2000 | Alloul et al. |
| 6,084,628 A | 7/2000 | Sawyer |
| 6,101,484 A | 8/2000 | Halbert |
| 6,181,927 B1 | 1/2001 | Welling, Jr. et al. |
| 6,269,343 B1 | 7/2001 | Pallakoff |
| 6,351,279 B1 | 2/2002 | Sawyer |
| 6,442,529 B1 | 8/2002 | Krishan et al. |
| 6,493,437 B1 | 12/2002 | Olshansky |
| 6,519,571 B1 | 2/2003 | Guheen et al. |
| 6,604,089 B1 | 8/2003 | Van Horn et al. |
| 6,631,356 B1 | 10/2003 | Van Horn |
| 6,691,032 B1 | 2/2004 | Irish et al. |
| 6,862,575 B1 | 3/2005 | Anttila et al. |
| 6,985,879 B2 | 1/2006 | Walker et al. |
| 6,996,579 B2 | 2/2006 | Leung |
| 7,039,599 B2 | 5/2006 | Merriman et al. |
| 7,085,682 B1 | 8/2006 | Heller et al. |
| 7,107,230 B1 | 9/2006 | Halbert |
| 7,120,592 B1 | 10/2006 | Lewis |
| 7,124,099 B2 | 10/2006 | Mesaros |
| 7,124,107 B1 | 10/2006 | Pishevar et al. |
| 7,146,330 B1 | 12/2006 | Alon |
| 7,181,419 B1 | 2/2007 | Mesaros |
| 7,184,972 B2 | 2/2007 | Flaherty |
| 7,194,427 B1 | 3/2007 | Van Horn |
| 7,197,544 B2 | 3/2007 | Wang et al. |
| 7,240,843 B2 | 7/2007 | Paul |
| 7,243,082 B1 | 7/2007 | Forlai |
| 7,249,056 B1 | 7/2007 | Crouthamel et al. |
| 7,263,498 B1 | 8/2007 | Van Horn |
| 7,272,575 B2 | 9/2007 | Vega |
| 7,319,881 B2 | 1/2008 | Endo |
| 7,349,827 B1 | 3/2008 | Heller et al. |
| 7,389,118 B2 | 6/2008 | Vesikivi et al. |
| 7,400,711 B1 | 7/2008 | Ford et al. |
| 7,463,898 B2 | 12/2008 | Bayne |
| 7,467,103 B1 | 12/2008 | Murray et al. |
| 7,480,627 B1 | 1/2009 | Van Horn |
| 7,536,324 B2 | 5/2009 | Perkowski |
| 7,555,466 B2 | 6/2009 | Eglen |
| 7,593,871 B1 | 9/2009 | Mesaros |
| 7,599,852 B2 | 10/2009 | Bosarge et al. |
| 7,599,858 B1 | 10/2009 | Grady |
| 7,650,431 B2 | 1/2010 | Wang et al. |
| 7,664,726 B2 | 2/2010 | Jain et al. |
| 7,672,897 B2 | 3/2010 | Chung |
| 7,751,548 B1 | 7/2010 | Mashinsky et al. |
| 7,844,488 B2 | 11/2010 | Merriman et al. |
| 7,917,402 B2 | 3/2011 | Rolf et al. |
| 8,069,169 B2 | 11/2011 | Fitzpatrick et al. |
| 8,117,464 B1 | 2/2012 | Kogelnik |
| 8,292,741 B2 | 10/2012 | Burman et al. |
| 8,407,084 B2 | 3/2013 | Chuch |
| 8,419,535 B2 | 4/2013 | Miller et al. |
| 8,423,892 B1 | 4/2013 | Marsland et al. |
| 8,433,611 B2 | 4/2013 | Lax et al. |
| 8,460,107 B2 | 6/2013 | Barclay et al. |
| 8,485,878 B2 | 7/2013 | Aaron et al. |
| 8,491,395 B2 | 7/2013 | Auterio et al. |
| 8,506,409 B2 | 8/2013 | Bethke et al. |
| 8,515,825 B2 | 8/2013 | Ross et al. |
| 8,533,039 B1 | 9/2013 | Winslade et al. |
| 8,560,537 B2 | 10/2013 | Ramer et al. |
| 8,573,491 B2 | 11/2013 | Bennett et al. |
| 2001/0029464 A1 | 10/2001 | Schweitzwer |
| 2001/0044745 A1 | 11/2001 | Shaw |
| 2001/0047294 A1 | 11/2001 | Rothschild |
| 2002/0052925 A1 | 5/2002 | Kim et al. |
| 2002/0065713 A1 | 5/2002 | Awada et al. |
| 2002/0071076 A1 | 6/2002 | Webb |
| 2002/0072967 A1 | 6/2002 | Jacobs et al. |
| 2002/0077988 A1 | 6/2002 | Sasaki et al. |
| 2002/0090985 A1 | 7/2002 | Tochner et al. |
| 2002/0091569 A1 | 7/2002 | Kitaura |
| 2002/0094868 A1 | 7/2002 | Tuck et al. |
| 2002/0103647 A1 | 8/2002 | Houplain |
| 2002/0111201 A1 | 8/2002 | Lang |
| 2002/0160761 A1 | 10/2002 | Wolfe |
| 2002/0169835 A1 | 11/2002 | Paul, Jr. et al. |
| 2002/0198777 A1 | 12/2002 | Yuasa |
| 2003/0004802 A1 | 1/2003 | Callegari |
| 2003/0032409 A1 | 2/2003 | Hutcheson et al. |
| 2003/0069785 A1 | 4/2003 | Lohse |
| 2003/0096662 A1 | 5/2003 | Iwami |
| 2003/0144035 A1 | 7/2003 | Weinblatt |
| 2003/0158776 A1 | 8/2003 | Landesmann |
| 2003/0172376 A1 | 9/2003 | Coffin, III |
| 2003/0177347 A1 | 9/2003 | Schneier |
| 2003/0233276 A1 | 12/2003 | Pearlman |
| 2004/0048604 A1 | 3/2004 | Idei |
| 2004/0068440 A1 | 4/2004 | Porato |
| 2004/0103023 A1 | 5/2004 | Irwin |
| 2004/0148424 A1 | 7/2004 | Berkson et al. |
| 2004/0177003 A1 | 9/2004 | Liao |
| 2004/0220851 A1 | 11/2004 | Silver et al. |
| 2005/0044483 A1 | 2/2005 | Maze et al. |
| 2005/0055409 A1 | 3/2005 | Alsarraf et al. |
| 2005/0096982 A1 | 5/2005 | Morton et al. |
| 2005/0130685 A1 | 6/2005 | Jenkin |
| 2005/0131761 A1 | 6/2005 | Trika et al. |
| 2005/0165640 A1 | 7/2005 | Kotorov |
| 2005/0192000 A1 | 9/2005 | Lloyd |
| 2005/0273351 A1 | 12/2005 | Chudnovsky |
| 2006/0004713 A1 | 1/2006 | Korte et al. |
| 2006/0041469 A1 | 2/2006 | Mathis |
| 2006/0041477 A1 | 2/2006 | Zheng |
| 2006/0080111 A1 | 4/2006 | Homeier Beals |
| 2006/0111967 A1 | 5/2006 | Forbes |
| 2007/0033133 A1 | 2/2007 | Pishevar |
| 2007/0043651 A1 | 2/2007 | Xiao |
| 2007/0073593 A1 | 3/2007 | Perry et al. |
| 2007/0121843 A1 | 5/2007 | Atazky et al. |
| 2007/0140176 A1 | 6/2007 | Bachenberg |
| 2007/0173236 A1 | 7/2007 | Vishwanathan et al. |
| 2007/0192182 A1 | 8/2007 | Monaco |
| 2007/0203792 A1 | 8/2007 | Rao |
| 2007/0207780 A1 | 9/2007 | McLean |
| 2007/0241189 A1 | 10/2007 | Slavin |
| 2007/0244750 A1 | 10/2007 | Grannan et al. |
| 2007/0265915 A1 | 11/2007 | Gould et al. |
| 2007/0271139 A1 | 11/2007 | Fiorini |
| 2007/0281692 A1 | 12/2007 | Bucher |
| 2007/0290031 A1 | 12/2007 | Singh |
| 2008/0052169 A1 | 2/2008 | O'Shea et al. |
| 2008/0119168 A1 | 5/2008 | Farkas et al. |
| 2008/0126240 A1 | 5/2008 | Banbury |
| 2008/0133366 A1 | 6/2008 | Evans |
| 2008/0133678 A1 | 6/2008 | Woodham et al. |
| 2008/0167102 A1* | 7/2008 | Diakopoulos ............ A63F 13/10 463/11 |
| 2008/0172285 A1 | 7/2008 | Hurowitz |
| 2008/0183587 A1 | 7/2008 | Joo et al. |
| 2008/0235093 A1 | 9/2008 | Uland |
| 2008/0255966 A1 | 10/2008 | Kopelman |
| 2008/0256233 A1 | 10/2008 | Hall et al. |
| 2008/0263584 A1 | 10/2008 | Salo et al. |
| 2008/0270363 A1 | 10/2008 | Hunt et al. |
| 2008/0287150 A1 | 11/2008 | Jiang et al. |
| 2009/0005140 A1 | 1/2009 | Rose et al. |
| 2009/0017913 A1 | 1/2009 | Bell et al. |
| 2009/0030774 A1 | 1/2009 | Rothschild et al. |

(56) References Cited

U.S. PATENT DOCUMENTS

| | | | |
|---|---|---|---|
| 2009/0099929 | A1 | 4/2009 | Thibedeau |
| 2009/0106368 | A1 | 4/2009 | Padveen et al. |
| 2009/0198622 | A1 | 8/2009 | Temte |
| 2009/0204901 | A1 | 8/2009 | Dharmaji et al. |
| 2009/0240629 | A1 | 9/2009 | Xie |
| 2009/0287555 | A1 | 11/2009 | Faraee |
| 2009/0287574 | A1 | 11/2009 | Kane |
| 2009/0307145 | A1 | 12/2009 | Mesaros |
| 2010/0016080 | A1 | 1/2010 | Garden et al. |
| 2010/0124991 | A1 | 5/2010 | O'Sullivan et al. |
| 2010/0125490 | A1 | 5/2010 | Kiciman et al. |
| 2010/0287011 | A1 | 11/2010 | Muchkaev |
| 2010/0318418 | A1 | 12/2010 | Wertheimer et al. |
| 2011/0039623 | A1 | 2/2011 | Levenson |
| 2011/0093318 | A1 | 4/2011 | Guday et al. |
| 2011/0288917 | A1 | 11/2011 | Wanek et al. |
| 2012/0047017 | A1 | 2/2012 | Hernandez et al. |
| 2012/0078696 | A1 | 3/2012 | Roark |
| 2012/0142429 | A1 | 6/2012 | Muller |
| 2012/0197724 | A1 | 8/2012 | Kendall |
| 2012/0239483 | A1 | 9/2012 | Yankovich et al. |
| 2012/0323689 | A1 | 12/2012 | Metcalf et al. |
| 2013/0054366 | A1 | 2/2013 | Roundtree et al. |
| 2013/0060634 | A1* | 3/2013 | Corson ............... G06Q 30/02 705/14.58 |
| 2013/0246199 | A1 | 9/2013 | Carlson |
| 2013/0290101 | A1 | 10/2013 | Arini et al. |

FOREIGN PATENT DOCUMENTS

| | | |
|---|---|---|
| JP | 2006113888 | 4/2006 |
| JP | 2007/219840 A | 8/2007 |
| KR | 2006/028602 A | 3/2006 |
| WO | 96/24213 A1 | 8/1996 |
| WO | 9946709 | 9/1999 |
| WO | 00/41121 A1 | 7/2000 |
| WO | 0070585 | 11/2000 |
| WO | 01/11472 | 2/2001 |
| WO | 01/16853 A1 | 3/2001 |
| WO | 2004077319 | 9/2004 |
| WO | 2007/139348 A1 | 12/2007 |
| WO | 2008141425 | 11/2008 |
| WO | 2009/148338 A2 | 12/2009 |
| WO | 2013006147 | 1/2013 |

OTHER PUBLICATIONS

Klepp, JT, Sharing on a Small Screen, Feb. 2008, MoConDi Ltd.

Cattelan, Renan G, et al., Prototyping a Novel Platform for the Free-Trade of Digital Content, [undated], pp. 79-88, WebMedia '06 Proceedings of the 12th Brazilian Symposium on Multimedia and the Web.

Silverpop, Share-to-Social, www.silverpop.com/whatweoffer/capabilities/share_to_social.html (http://web.archive.org/web/20081005061634/http://www.silverpop.com/whatweoffer/capabilities/share_to_social.html), [undated].

Perich, Filip, et al., Profile Driven Data Management for Pervasive Environments, [undated], pp. 361-370, Database and Expert Systems Applications, Springer Berlin Heidelberg.

Chakraborty, Dipanjan, et al., Dreggie: Semantic Service Discovery for M-commerce Applications, Workshop on Reliable and Secure Applications in Mobile Environment, 20th Symposium on Reliable Distributed Systems, [undated], pp. 28-31.

Cost, R. Scott, et al., ITtalks: A Case Study in the Semantic Web and DAML+ OIL, Intelligent Systems, IEEE, 2002, pp. 40-47, vol. 17, No. 1.

Avancha, Sasikanth, et al., P2P M-commerce in Pervasive Environments, ACM SIGecom Exchanges, 2003, pp. 1-9, vol. 3, No. 4.

Varshney, Upkar, et al., Mobile Commerce: Framework, Applications and Networking Support, Mobile Networks and Applications, 2002, pp. 185-198, vol. 7, No. 3.

Tveit, Amund, Peer-to-peer based Recommendations for Mobile Commerce, Proceedings of the 1st International Workshop on Mobile Commerce, ACM, Jul. 2001, pp. 26-29.

Sheshagiri, Mithun., et al., Using Semantic Web Services for Context-Aware Mobile Applications, MobiSys 2004 Workshop on Context Awareness, [undated].

Akriga, LiveScratch Wildfire Viral Campaigns with in-built Forwarding Motivation, www.akriga.com, Feb. 22, 2005.

Purpleace, Ripple Discover, Apr. 2004, Singapore.

Neumobility, Neutrac Platform, [undated], Seattle, Washington.

Callegari, Jeff, NeuMobility and Mapinfo Delivering Mobile Commerce Platform, Mapinfo Magazine, Spring 2001, pp. 6-9, vol. 6, No. 2.

StrongMail Influencer http://strongmail.com/technology/influencer/index.php (web.archive.org/web/20091012003154/http://strongmail.com/technology/influencer/index.php), [undated].

MacEachren, Alan M., et al., Geographic Visualization: Designing Manipulable Maps for Exploring Temporally Varying Georeferenced Statistics, Proceedings of IEEE Information Visualization Symposium, Research Triangle, [undated], pp. 87-94.

Navas, Julio C., et al., Geocast—Geographic Addressing and Routing, Proceedings of the 3rd Annual ACM/IEEE International Conference on Mobile Computing and Networking, [undated], pp. 66-76.

Ko, Young-Bae, et al., Geocasting in Mobile Ad Hoc Networks: Location-Based Multicast Algorithms, Proceedings of the 2nd IEEE Workshop on Mobile Computing Systems and Applications, [undated], pp. 101-110.

Groupon, Inc. v. Blue Calypso, LLC; PTAB Case No. CBM2013-00033; Final Written Decision; Paper 51; Dec. 17, 2014.

Groupon, Inc. v. Blue Calypso, LLC; Case No. CBM2013-00034; Final Written Decision; Paper 45; Dec. 17, 2014.

Groupon, Inc. v. Blue Calypso, LLC; Case No. CBM2013-00035; Final Written Decision; Paper 45; Dec. 17, 2014.

Groupon, Inc. v. Blue Calypso, LLC; Case No. CBM2013-00044; Final Written Decision; Paper 47; Dec. 17, 2014.

Groupon, Inc. v. Blue Calypso, LLC; Case No. CBM2013-00046; Final Written Decision; Paper 46; Dec. 17, 2014.

Groupon, Inc. v. Blue Calypso, LLC; Case No. CBM2013-00033; Paper 10; Dec. 19, 2013.

Groupon, Inc. v. Blue Calypso, LLC; Case No. CBM2013-00034; Paper 9; Dec. 19, 2013.

Groupon, Inc. v. Blue Calypso, LLC; Case No. CBM2013-00035; Paper 11; Dec. 19, 2013.

Groupon, Inc. v. Blue Calypso, LLC; Case No. CBM2013-00044; Paper 9; Jan. 17, 2014.

Groupon, Inc. v. Blue Calypso, LLC; Case No. CBM2013-00046; Paper 9; Jan. 17, 2014.

Chande, Suresh, "Viral Distribution Potential Based Active Node Identification for Ad Distribution in Viral Networks", International Journal of Mobile Marketing, vol. 4 No. 1, Jun. 2009.

Castella-Roca, Jordi, et al. "An Incentive-Based System for Information Providers Over Peer-to-Peer Mobile Ad-Hoc Networks", MDAI 2007, LNAI 4617, pp. 380-392, 2007.

Muhlhauser, Max, et al. "Collaboration in Opportunistic Networks", Dissertation, Apr. 30, 2007.

Shojima, Taiki, et al. "An Incentive Attached Peer to Peer Electronic Coupon System", Studies in Informatics and Control, vol. 13, No. 4, Dec. 2004.

Almeroth, Kevin, et al. "Coupons: Wide Scale Information Distribution for Wireless Ad Hoc Networks", undated.

Chen, Xiaoyan, et al., "An Efficient Spatial Publish/Subscribe System for Intelligent Location-Based Services," DEBS03, 2003, San Diego, USA.

"MobiPromo White-Label Wi-Fi Marketing System," MobiPromo System, (undated), http://mobipromosystem.com/mobipromo-system//#tab-id-2.

Skyhook Wireless, "Skyhook is Location," (undated), www.skyhookwireless.com.

Salim, Ali, et al., "Mobile Advertising a Case study of Mobile advertising Solutions," Bachelor Thesis, 2009, pp. 1-40, Stockholm, Sweden.

Xu, Heng, et al., "Perceived effectiveness of text vs. multimedia Location-Based Advertising messaging," Int. J. Mobile Communications, pp. 154-177, 2009, vol. 7, No. 2, Inderscience Enterprises Ltd.

(56) References Cited

OTHER PUBLICATIONS

Gao, J Kulkarni, V Ranavat, H Lee Chang Hsing Mei; A 2D Barcode-Based Mobile Payment System; Multimedia and Ubiquitous Engineering, 2009. MUE '09; Jun. 4-6, 2009; pp. 320-329.

Aigner, Manfred Dominikus, Sandra Feldhofer, Martin; A System of Secure Virtual Coupons Using NFC Technology; PerCom Workshops '07. Mar. 19-23, 2007; pp. 362-366.

Gao, Jagatesan; Understanding 2D-BarCode Tech and Appls in M-Commerce-Design and Implementation of a 2D Barcode Processing Solution; COMPSAC 2007; Jul. 24-27, 2007; pp. 49-56.

Kato, H. Tan, K.T.; 2D barcodes for mobile phones; Mobile Technology, Applications and Systems, 2005 2nd International Conference on; Nov. 15-17, 2005; p. 8.

Koung-Lung Lin Hsu, J.Y.-J. Han-Shen Huang Chun-Nan Hsu; A recommender for targeted advertisement of unsought products in e-commerce; CEC 2005; Jul. 19-22, 2005; pp. 101-108.

Ratsimor, O., et al., Intelligent Ad Hoc Marketing within Hotspot Networks. Technical Report TR-CS-03-27. Nov. 2003.

Kauffman, R. and Wang, B., Bid Together, Buy Together: On the Efficacy of Group-Buying Business Models in Internet-Based Selling. "The (R)evolution Goes Mobile", 5th Annual University of Minnesota Electronic Commerce Conference, Mar. 27-28, 2001. Minneapolis, MN.

Ratsimor, O., et al., eNecentive: A Framework for Intelligent Marketing in Mobile Peer-to-Peer Environments. Oct. 2003. ICEC '03 Proceedings of the 5th International Conference on Electronic Commerce. pp. 87-94.

Ming, Lok Jing, Peer-to-peer Personalized Mobile Ad Hoc Advertising Framework, Apr. 2005, Malaysia University of Science and Technology.

\* cited by examiner

SYSTEM AND METHOD FOR ADVERTISING DISTRIBUTION THROUGH MOBILE SOCIAL GAMING

CROSS-REFERENCE TO RELATED APPLICATIONS

This application claims priority to U.S. Patent Application No. 61/859,107, filed Jul. 26, 2013. The patent application identified above is incorporated here by reference in its entirety to provide continuity of disclosure.

BACKGROUND AND SUMMARY OF THE INVENTION

It is well known that traditional advertising media such as newspapers, public radio and television has suffered a dramatic decrease in popularity and advertising effectiveness with the advent of the internet and mobile phone technology. Sponsors, therefore, are highly motivated to identify new methods of distributing advertisements in order to create effective brand awareness. As newer technologies such as mobile phones evolve into highly sophisticated two-way communication systems, such technologies can be leveraged to provide trackable advertising impressions and brand awareness by directly displaying advertisements and testimonials to potential customers.

Today, consumers can control which advertisements reach them more effectively than in the past. For example, newer technologies like digital video recorders (DVRs) allow users to skip undesirable advertisements. Similarly satellite radio allows users to listen to music without commercials.

Consumers are increasingly connected to one another through social networking and spend a large percentage of their time interacting with their social network through their mobile phone and tablet devices.

With the declining ability to offer advertisements through traditional broadcast advertising media, this invention provides an advertising system that offers frequent and effective advertising to targeted audiences while immersing the consumers in a mobile social gaming experience.

This invention also provides a system in which recipients are drawn to physically interact with retail sponsors, visit store locations and encouraged to make purchases of products while immersed in the gaming experience.

This invention provides a gaming venue for an advertiser to offer an advertising campaign to one or more social communities.

Other advantages and aspects of the invention will become apparent upon reading the following disclosure.

DETAILED DESCRIPTION

Figure 1:
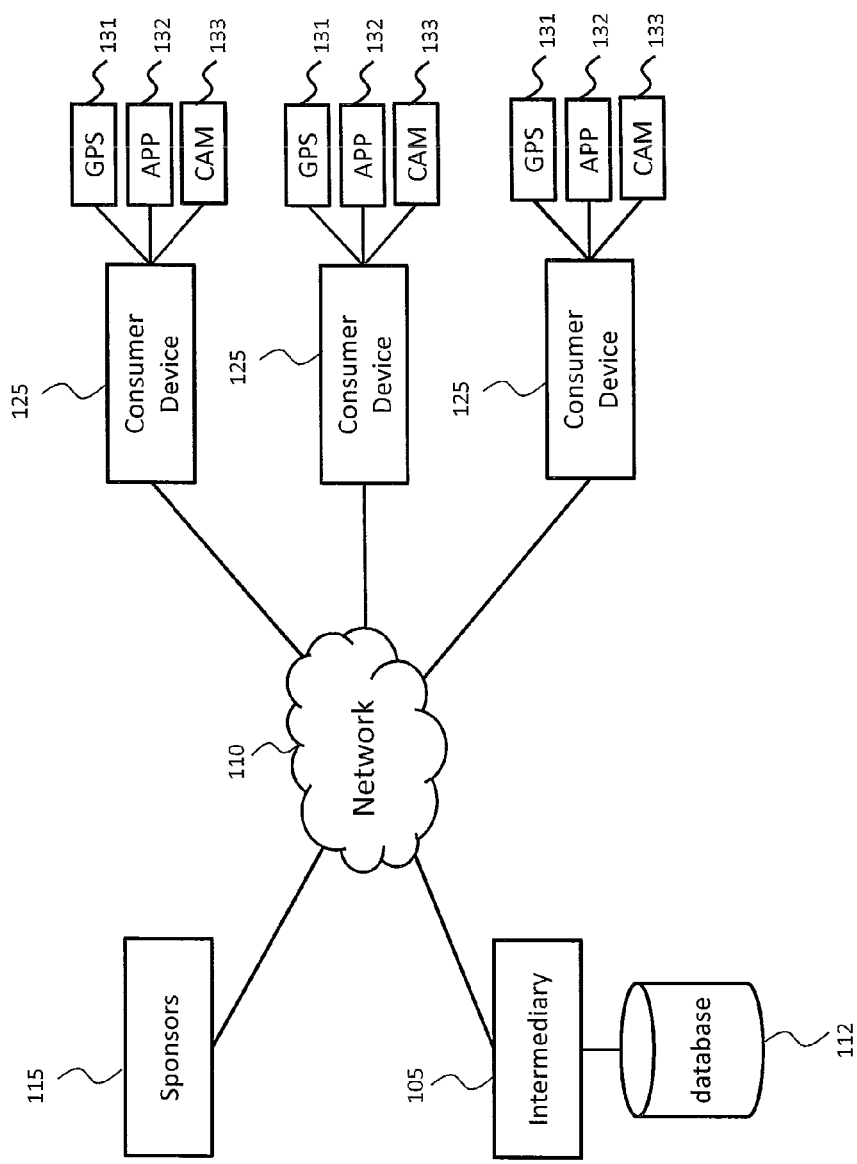
FIG. 1 is a block diagram of a preferred embodiment of a social game system for advertising.

While the making and using of various embodiments of the present disclosure are discussed in detail below, it should be appreciated that the present disclosure provides many applicable inventive concepts that can be embodied in a wide variety of specific contexts. The specific embodiments discussed herein are merely illustrative of specific ways to make and use the invention and do not delimit the scope of the invention.

It will be appreciated by those skilled in the art that aspects of the present disclosure may be illustrated and described herein in any of a number of patentable classes or context including any new and useful process, machine, manufacture, or composition of matter, or any new and useful improvement thereof. Therefore, aspects of the present disclosure may be implemented entirely in hardware, entirely in software (including firmware, resident software, micro-code, etc.) or combining software and hardware implementation that may all generally be referred to herein as a "circuit," "module," "component," or "system." Further, aspects of the present disclosure may take the form of a computer program embodied in one or more computer readable media having computer readable program code embodied thereon.

Any combination of one or more computer readable media may be utilized. The computer readable media may be a computer readable signal medium or a computer readable storage medium. For example, a computer readable storage medium may be, but not limited to, an electronic, magnetic, optical, electromagnetic, or semiconductor system, apparatus, or device, or any suitable combination of the foregoing. More specific examples of the computer readable storage medium would include, but are not limited to: a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. Thus, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. The propagated data signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, or any suitable combination thereof.

Computer program code for carrying out operations for aspects of the present disclosure may be written in any combination of one or more programming languages, including an object oriented programming language such as Java, C++, C#, .NET, Objective C, Ruby, Python SQL, or other modern and commercially available programming languages.

Aspects of the present disclosure are described with reference to flowchart illustrations and/or block diagrams of methods, systems and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices including phones and tablet devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The present disclosure provides a method and apparatus for delivering a mobile social game experience that provides a benefit to a set of advertisers to reach multiple social communities with a compelling message and further provides a benefit to the consumer of enhancing their relationships in their social community by immersing them in a game experience with their friends.

Referring to FIG. 1, an intermediary system 105 including a database 112 is connected to a network 110. One or more consumer devices 125 are connected to the network, each consumer device equipped with at least a GPS location device 131, a camera 133 and application 132 operated by the local operating system of the consumer device. Application 132 includes a set of instructions, that when executed by a local processor of the consumer device, carry out steps of methods described below. Other steps of the methods are carried out by a set of instructions executed on the intermediary system.

One or more sponsors 115 are connected to network 110. Each sponsor is associated with a set of sponsor locations that provide physical venues for playing a set of games, gathering permits related to the games, and redeeming rewards related to the games as described below.

Figure 2:
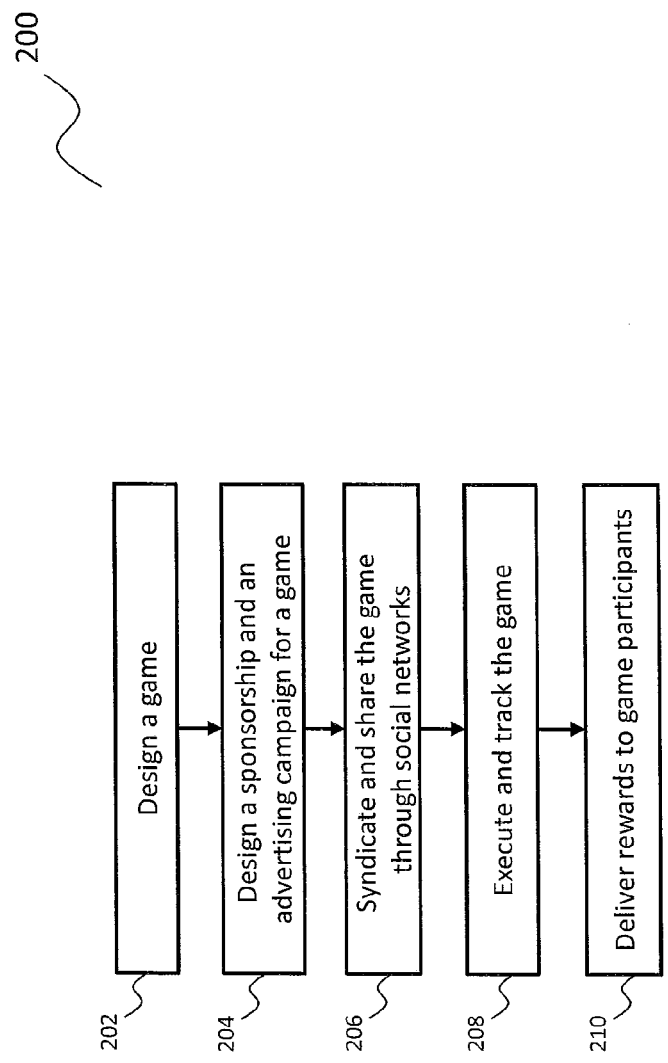
FIG. 2 is a flowchart of a preferred embodiment of a method for advertising using a social game system.

Referring to FIG. 2, a method for advertising 200 through social networks is disclosed. At step 202, a game is designed including a set of rules, a number of participants, a profile for participants, a set of sponsors and a set of sponsored locations, a "skin" for the game, and methods for obtaining rewards. In a preferred embodiment, the set of rules include rules for organizing and equipping participants at one or more sponsored locations to interact with each other while playing the game and while receiving compelling rewards related to an advertising campaign. The "skin" encompasses the graphic design of the game, designed in conjunction with the advertising campaign, for displaying game information on the application on the consumer devices and for displaying information related to the game at the sponsored locations.

At step 204, an advertising campaign is generated for a mobile social game. The advertising campaign includes a set of graphics and textual information such as logos, branding images, websites designs and the like. The advertising campaign also includes a set of rewards and a set of game rules for incentivizing and receiving rewards during a game. Further, the advertising campaign includes a selection of sponsored locations for carrying out a game and coupons for use with an immediate purchase at a sponsor location while playing the game.

In a first embodiment, there is a one sponsor for one game. The one game may have multiple designs, repeated and implemented multiple times with varying advertising content. In a second embodiment, there are multiple sponsors for one game and the game may be repeated with multiple designs, varying advertising content and various rules and skins. In a third embodiment there are multiple sponsors for multiple games with multiple game designs. In a fourth embodiment, there are multiple games with multiple game designs for one sponsor. The first embodiment is used as the example embodiment in this disclosure; however, the invention should not be limited by this example embodiment.

At step 206, the game from step 204 is syndicated and shared by the sponsor, the participants and their social communities. The sponsors share the invitations to their existing social media forums and otherwise advertise the game through conventional media. Participants are encouraged to share invitations to play the game as they sign up and interact with the game. This process is simplified by having participants connect the game to their social networks during a sign up process. Rewards related to the playing of the game or related to sponsored products can be distributed at sign-up to encourage participants to share invitations. Advertisements and immediate rewards are made available during the game as the participants interact using their consumer devices.

In some situations, the intermediary will automatically post announcements on the participant's social network, for example, at sign-up and during a game when certain actions occur and/or rewards are earned.

At step 208, the game is executed by the intermediary. The set of consumer devices interact with each other during the game by communication events distributed by the intermediary. The intermediary tracks the location, points, a set of rewards, a winning participant and game related statistics of each participant and confirms actions, awards points, delivers messages and generally executes all the features of the game through communication with the set of consumer devices using the application.

At step 210, the intermediary communicates the set of rewards to game participants through the application. The rewards include redeemable digital coupons. Rewards are delivered during and after the game according to the rules of the game.

Figure 3:
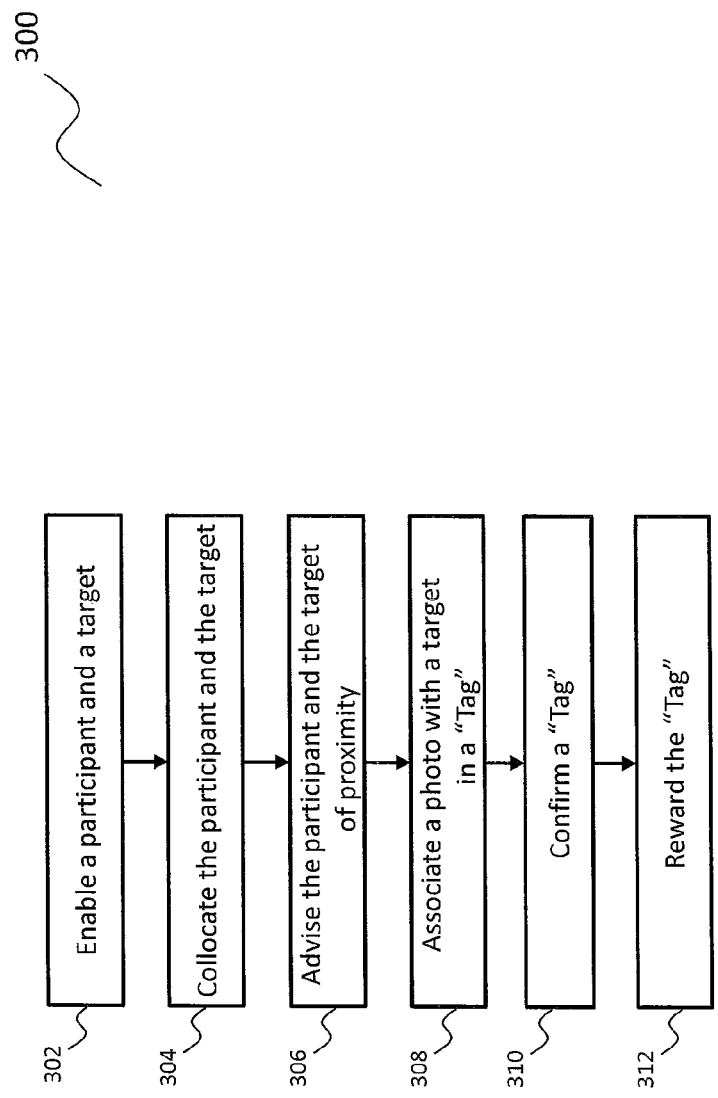
FIG. 3 is a flowchart of a preferred embodiment of a social game in a social game system for advertising.

Referring to FIG. 3, a method 300 of a preferred embodiment of a game is described. At step 302, at least a participant and a target are enabled to play the game. To enable the participant, the application is installed on the consumer device associated with the participant and the participant may be provided an initial number of "permits" to play and a set of instructions to receive additional "permits" as will be further described below. The "target," which is another participant, is similarly enabled.

In an alternate embodiment, the target may be any physically locatable object, which can be enabled, for example by integrating a Quick Reference ("QR") code, Universal Product Code ("UPC"), barcode or other digitally recognizable feature, cross referenced to the consumer device's physical location as known through its internal GPS signal into an actual object or a display of an object.

At step 304, the intermediary tracks the location of the participant and the location of the target to determine if the participant and the target become "collocated." "Collocation" is defined in the rules of the game. In one embodiment, collocation is defined as being within a predetermined physical proximity, for example, a 100 foot radius, at the same time. In an alternate embodiment, collocation means traversing along the same path within a predefined time frame. In one embodiment, the GPS devices of the consumer devices associated with the participant and target is required to report their respective locations to the intermediary during the game. In an alternate embodiment, the locations of the participants may be determined by participant self-reporting a physical location, such as transmitting longitude and latitude data or transmitting a photograph of a landmark or a QR code, to the intermediary At step 306, as the game progresses, the participant receives location information from the intermediary advising the participant of the proximity of the target. Similarly, the target receives location information advising the target of the proximity of the participant. Upon collocation, the intermediary further advises both the participant and the target of the collocation.

At step 308, a "tag" event occurs between the participant and the target. The "tag" event occurs when the participant sites the target, indicates a "tag" on their consumer device and snaps a photo of the target. The target is sent a message from the intermediary indicating the "tag".

At step 310, the "tag" is confirmed by the participant by sending the photo to the intermediary. The target is provided an opportunity to challenge the "tag." If not challenged, the tag is "confirmed."

At step 312, the "tag" is rewarded by assigning points to the participant based on a point value assigned to the target. Target point value can be different for each participant or the same for all participants based on the rules of the game. At the end of the game, the points are tallied for all the participants of the game and a winner is decided. The winner receives additional rewards based on the number of "tags" made and number of points accumulated.

Figure 4:
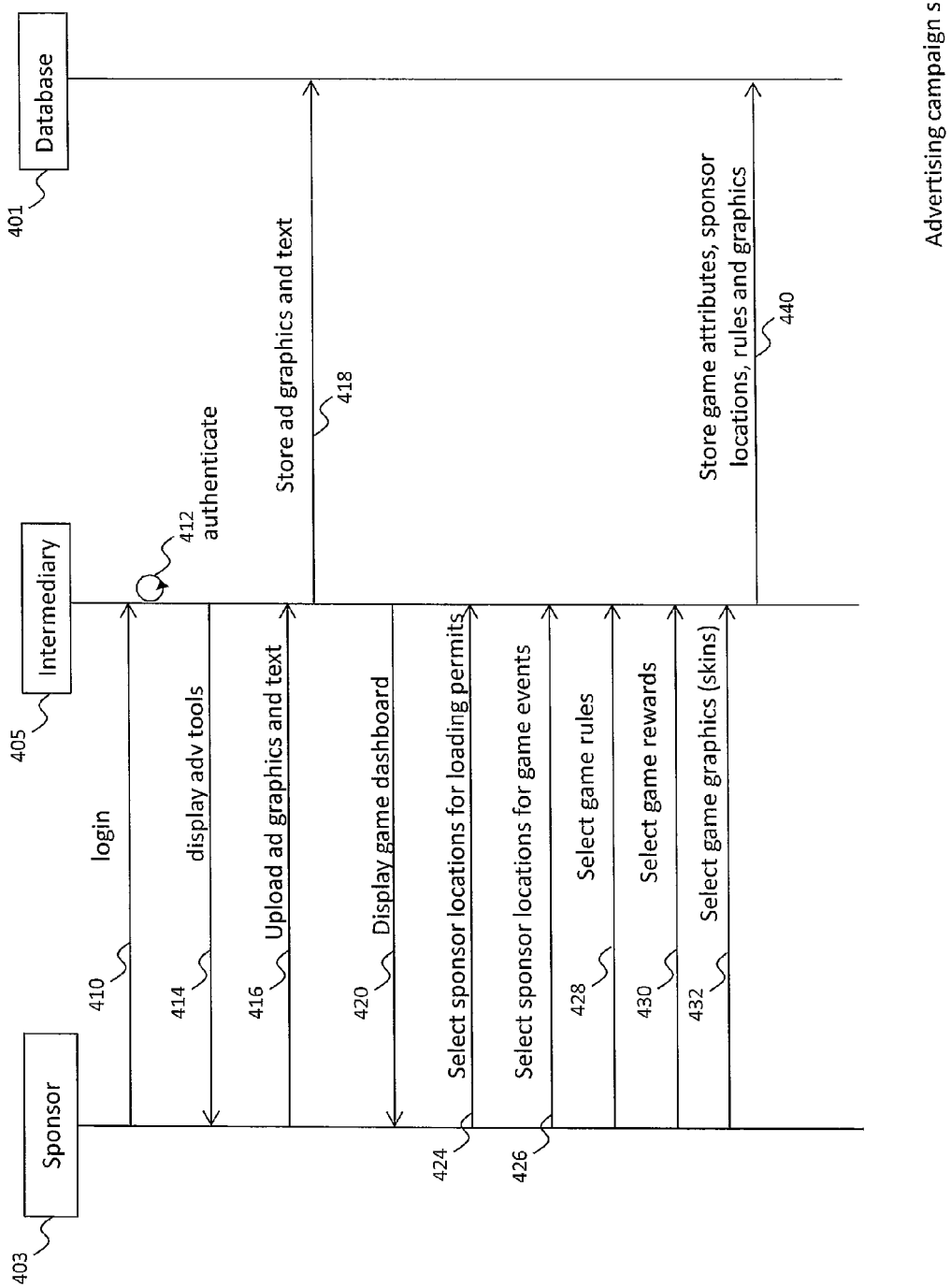
FIG. 4 is a sequence diagram of an advertising campaign set up.

Referring to FIG. 4, a sequence diagram is disclosed for a method to set up an advertising campaign. The method involves sponsor 403, intermediary 405 and database 401. At step 410, the sponsor initiates a login authentication with the intermediary through a web server. The sponsor operates a web client such as a web browser. At step 412, the intermediary authenticates with the sponsor based on a previously agreed set of credentials. At step 414, intermediary displays an advertiser tool for setting up advertising materials. At step 416, the sponsor uploads a set of ad graphics and text to support the advertising campaign. At step 418, the intermediary stores the ad graphics and text to the database.

At step 420, the intermediary displays a game design dashboard on a webpage for the sponsor, including a setting of selections through interactive buttons and dialogs. At step 424, the sponsor selects a set of sponsor locations for loading permits. At step 426, the sponsor selects a set of sponsor locations for hosting game events.

At step 428, the sponsor selects a set of game rules from a predefined set of game rules. An example of a game rule is to allow dynamic adjustment of a participant's target points or place a "bounty" on a participant based on the participant's location, rank, social reach or accumulated points. At step 430, the sponsor selects a set of game rewards including when and how the rewards are to be distributed. Rewards can be distributed during many different times in a game experience, for example, at the time of joining the game, at the time of scoring a "tag", at the time of entering the sponsor locations, and at the end of the game.

At step 432, the sponsor selects game graphics. In selecting graphics, a "skin" for the game is selected. A "skin" represents a design theme that is downloaded and installed onto the application of the consumer device which gives a game a particular aesthetic appearance. Also, the sponsor selects the placement of particular images in different aspects of the game. For example, the sponsor chooses a branding image for the game and a logo for the "tag" photos.

At step 440, the intermediary collects the selections made by the sponsor and stores the various game attributes, sponsor locations, game rules, rewards and graphics into the database.

Figure 5:
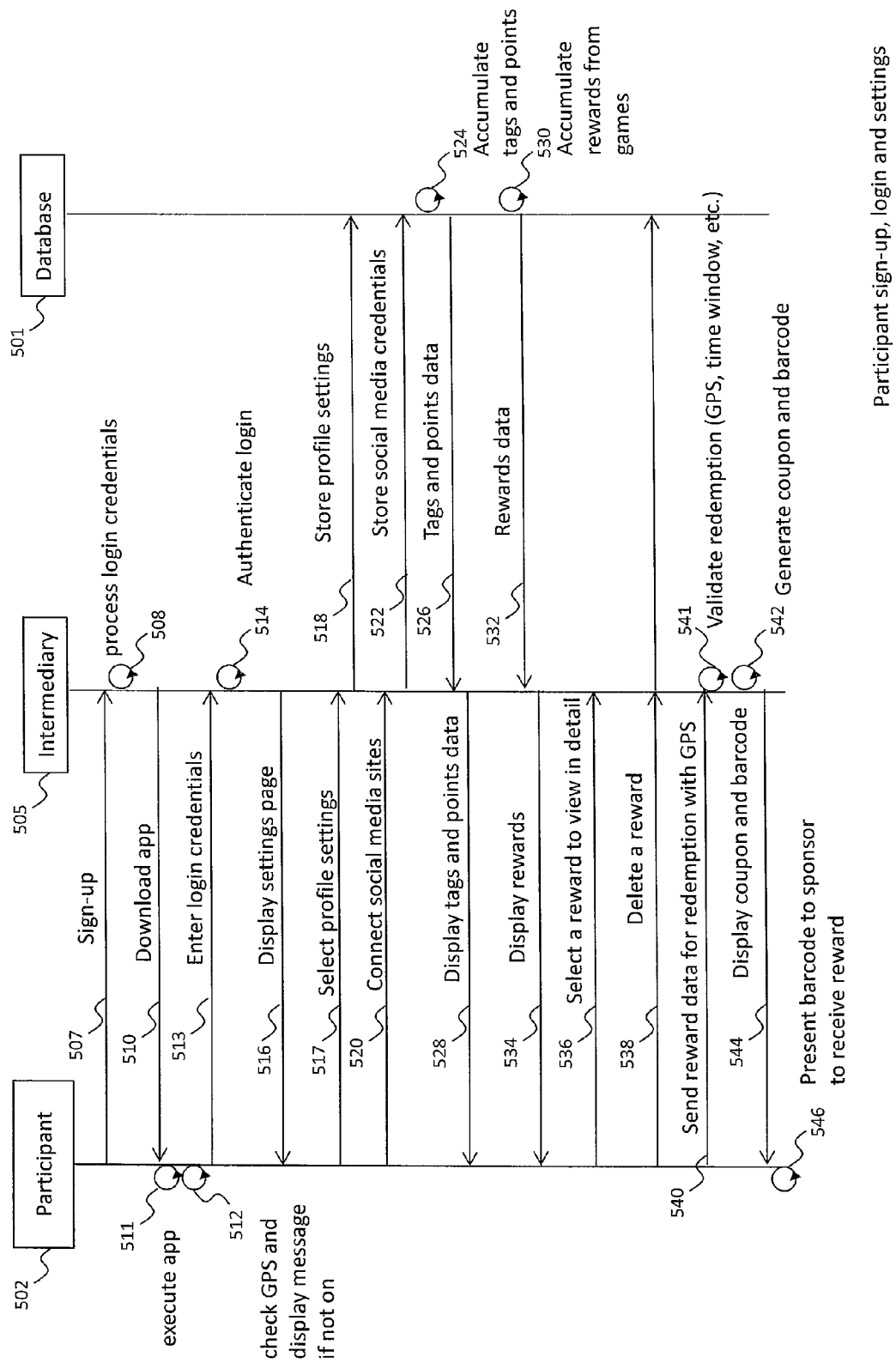
FIG. 5 is a sequence diagram of a participant sign-up, login and settings.

Referring to FIG. 5, a sequence diagram is disclosed for a method for participant sign-up, login and settings process. The method involves participant 502, intermediary 505 and database 501. Participant 502 is a consumer device operated by a consumer. At step 507, the participant engages in a "sign-up" on a web page served by the intermediary where information is gathered or through a mobile app store. At step 508, the intermediary processes the information, including login credentials from the participant. At step 510, the application is downloaded to the participant and, at step 511, is executed. At step 512, the application checks the consumer device to make sure the GPS is enabled. If the GPS is not enabled, a message is displayed to the participant to agree to have GPS turned on. Also, step 512 is performed at any time the participant selects to execute the application and engage in the game experience.

At step 513, the participant logs in to the intermediary, using the application, with the set of login credentials. At step 514, the intermediary validates the set of login credentials. Steps 513 and 514 may be automatic following step 511.

Once logged in, at step 516, a display settings page is presented to the participant. At step 517, a set of profile information is selected by the participant. The set of profile information includes demographic data for the consumer and general information required to match the consumer with various game opportunities. At step 518, the set of profile information is stored in the database.

At step 520, the participant selects a set of social media sites and connects them to the application by supplying a set of login credentials. At step 522, the set of login credentials is stored in the database.

At step 524, the database stores permit data for tags and points data accumulated from games over time as the consumer participates in games. At step 526, the permit data and points data is used by the intermediary during a game. At step 528, the permit data and points data is transferred to the participant and displayed.

At step 530, the database stores rewards accumulated from games over time as the consumer participates in games. At step 532, the rewards data is used by the intermediary during a game. At step 534, the rewards data is transferred to the participant and displayed in a list.

At step 536, the participant selects a reward from the list and a set of detail reward information is displayed. At step 538, the participant deletes a reward. The reward is no longer available to be redeemed and removed from the intermediary system and database or flagged as abandoned. At step 540, the participant selects a reward to be redeemed and the reward data and GPS information is sent to the intermediary. At step 541, the reward is validated by checking a set of conditions configured with the reward by the sponsor including, but not limited to, a time window condition and a location condition. The participant's location (GPS) is checked to match a location condition. The time is checked to be in a matching time window for validity. If validated, then at step 542, the intermediary generates a coupon and a barcode. At step 544, the coupon and barcode are displayed by the participant. At step 546, the barcode is scanned to receive the reward, for example, a sponsor barcode scanner at a point of sale scans the barcode so the consumer can purchase an item using the coupon.

Figure 6:
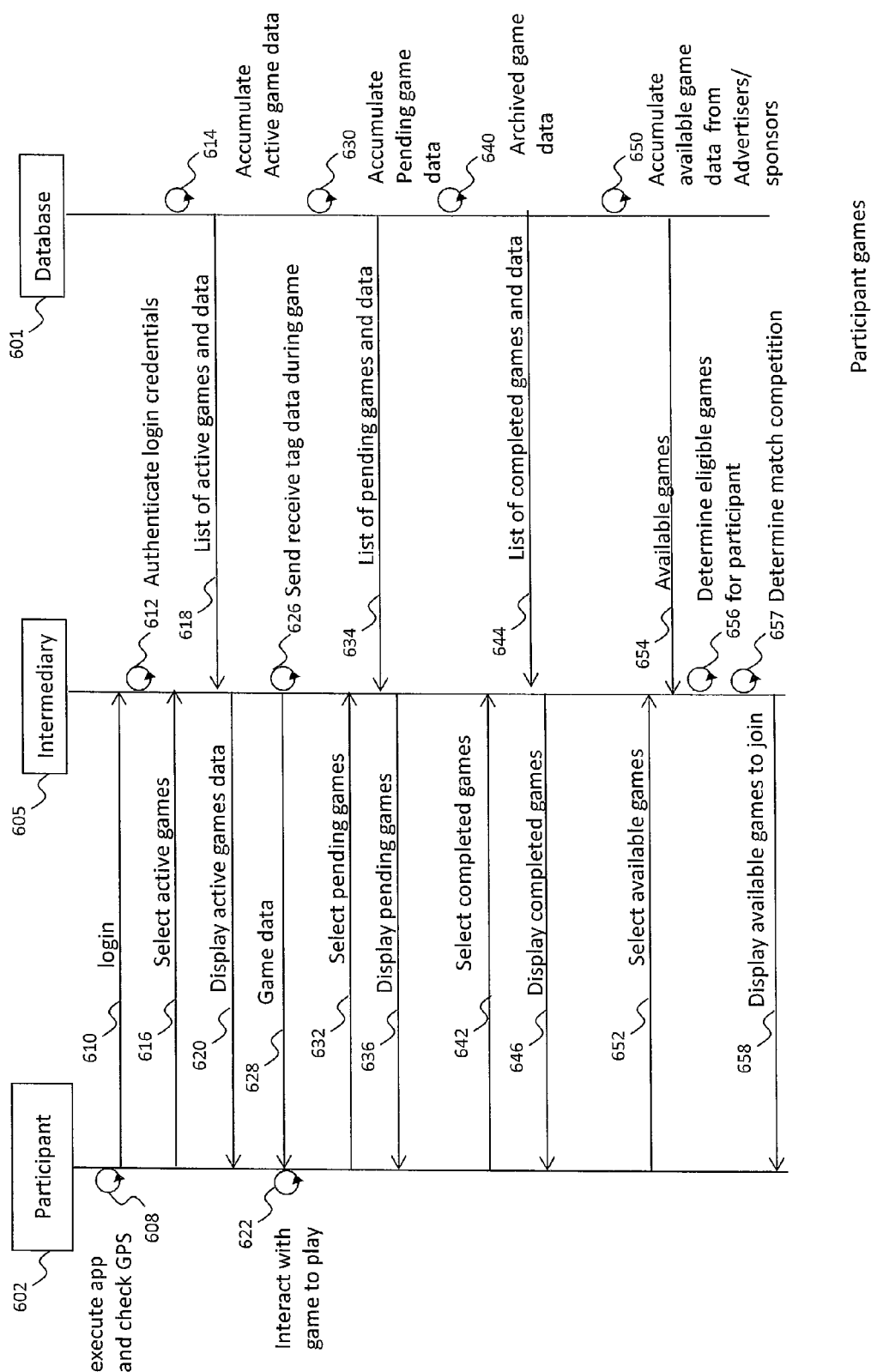
FIG. 6 is a sequence diagram of participant game interactions.

Referring to FIG. 6, a sequence diagram is disclosed for a method for managing multiple games. The method involves intermediary 605 having a database 601 interacting with a participant 602. At step 608, participant executes the application and the GPS capability is checked. At step 610, participant 602 performs a login with intermediary 605 where at step 612, intermediary authenticates the login credentials.

At step 614, database 601 continuously accumulates active game data for all participants in all active games. At step 616, the participant selects to view active games. At step 618, intermediary retrieves a list of active games and the active game data from the database and at step 620, the intermediary forwards, to the participant for display, the list of active games in which the participant is involved along with the active game data.

At step 622, the participant selects an active game and interacts with other participants in the active game. During the interaction (step 626) the intermediary sends and receives game data including "tags" and messages related to "tags." At step 628, the intermediary forwards the game data to the participant for display.

For games that are pending to start, the database at step 630, accumulates a list of pending games and associated pending game data. At step 632, participant 602 selects to view pending games. At step 634, intermediary 605 retrieves the list of pending games for which the participant has joined and the associated pending game data. At step 636, the intermediary forwards, to the participant for display, the list of pending games for the participant and the associated pending game data.

As each game finishes, at step 640, the database continuously archives completed game data including rankings, statistics, winner information and reward information. At step 642, participant 602 selects to view completed games. At step 644, the intermediary retrieves the completed game data for the participant from the database and at step 646, forwards the completed game data to the participant for display.

The participant is provided an opportunity to join available games. At step 650, the database accumulates new games as they are specified by sponsors and placed on a schedule. At step 652, participant 602 selects to view a set of available games. At step 654, the intermediary retrieves a list of available games and available game information from the database. At step 656, the intermediary determines a list of available games in which the participant is eligible to participate. For example, the sponsor may include a game profile with a new game. At step 657, the game profile is checked against the participant's profile to determine if there is sufficient match. In another example, a particular game may require that the participant complete a prerequisite game to be eligible. At step 658, the intermediary forwards, to the participant for display, the list of available games in which the participant is eligible to participate.

Figure 7:
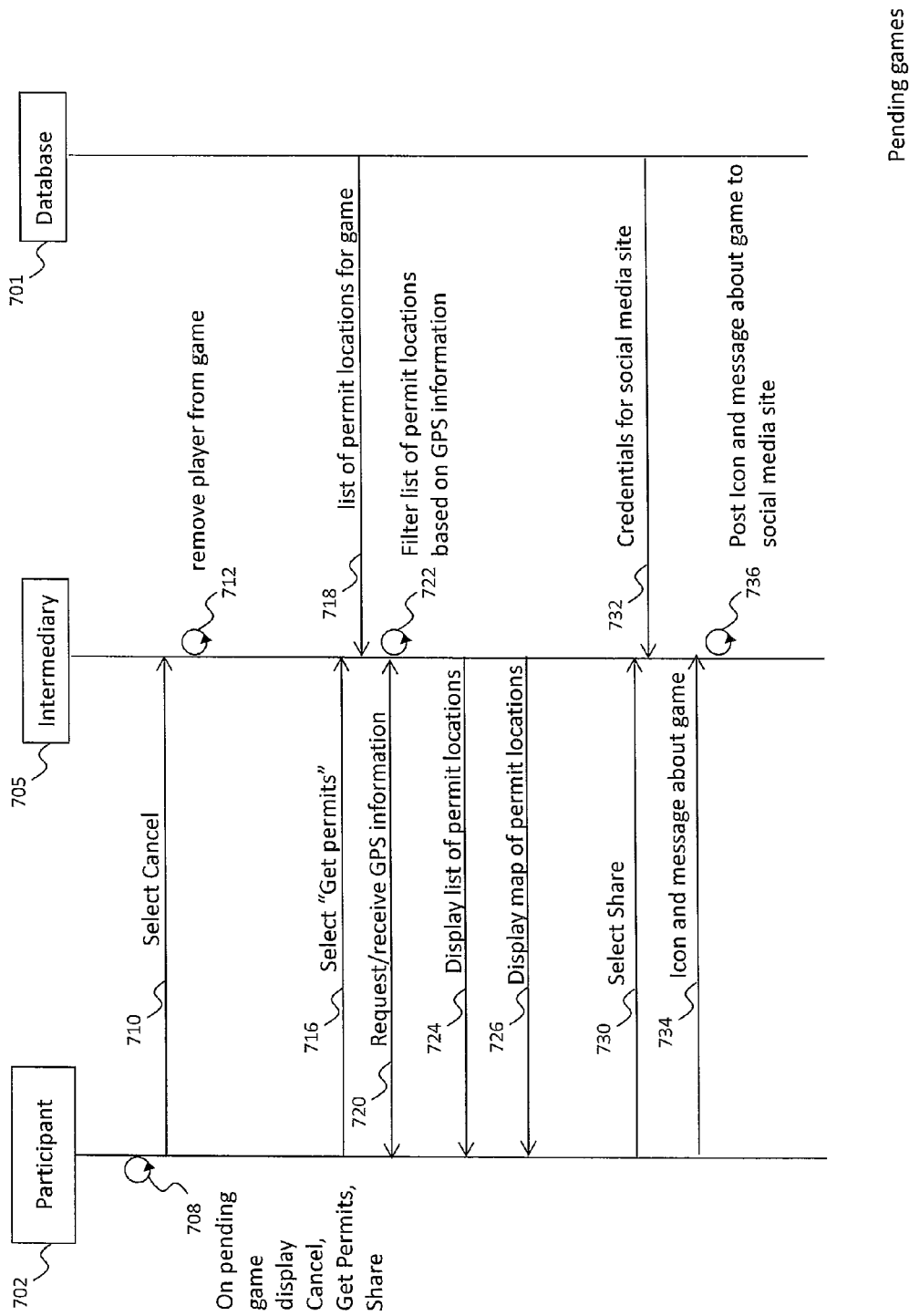
FIG. 7 is a sequence diagram of pending games interaction.

Referring to FIG. 7, a sequence diagram is disclosed for a method for managing pending games. The method involves intermediary 705 having a database 701 interacting with a participant 702. The method assumes that the participant has logged in with the intermediary and has selected to view pending games as in step 636. Then, at step 708, participant 702, selects to display detailed pending game information for a pending game which includes the ability to cancel the pending game, get permits for the pending game and share the pending game.

At step 710, the participant chooses to cancel the pending game and at step 712, the intermediary removes the participant from the pending game.

At step 716, the participant selects to "get permits". A permit is a permission to "tag" another participant during a game. Permits may be game specific or they may be general. The participant must accumulate permits prior to and during a game, in order to "tag" others and fully participate in the game. If the participant runs out of permits, then he/she can no longer tag others, however, he/she can be tagged by others. Permits are obtained by visiting locations and following a prescribed process as explained in more detail below.

At step 718, the intermediary retrieves a list of permit locations for the pending game. At step 720, the intermediary requests and receives GPS coordinate information from the participant. At step 722, the intermediary filters the list of permit locations based on the GPS coordinate information, sorting the list in order of proximity to the participant. At step 724, the list of permit locations is displayed for the participant and an option to view a map of the permit locations is provided. If the participant chooses to do so, at step 726, a map of the permit locations is displayed for the participant. Additional information can be included with the list of permit locations, such as the number of permits available per location, time limits and any other restrictions that may apply in order to obtain permits.

At step 730, the participant selects to share the pending game with another participant. At step 732, the intermediary retrieves the set of credentials for social media sites to which the participant is connected. At step 734, the participant creates an invitation message to join the game, including an icon or logo associated with the game. The participant further selects a social media site and forwards the message to the intermediary. The intermediary, at step 736, then posts the invitation message to at least one selected social media site.

Figure 8:
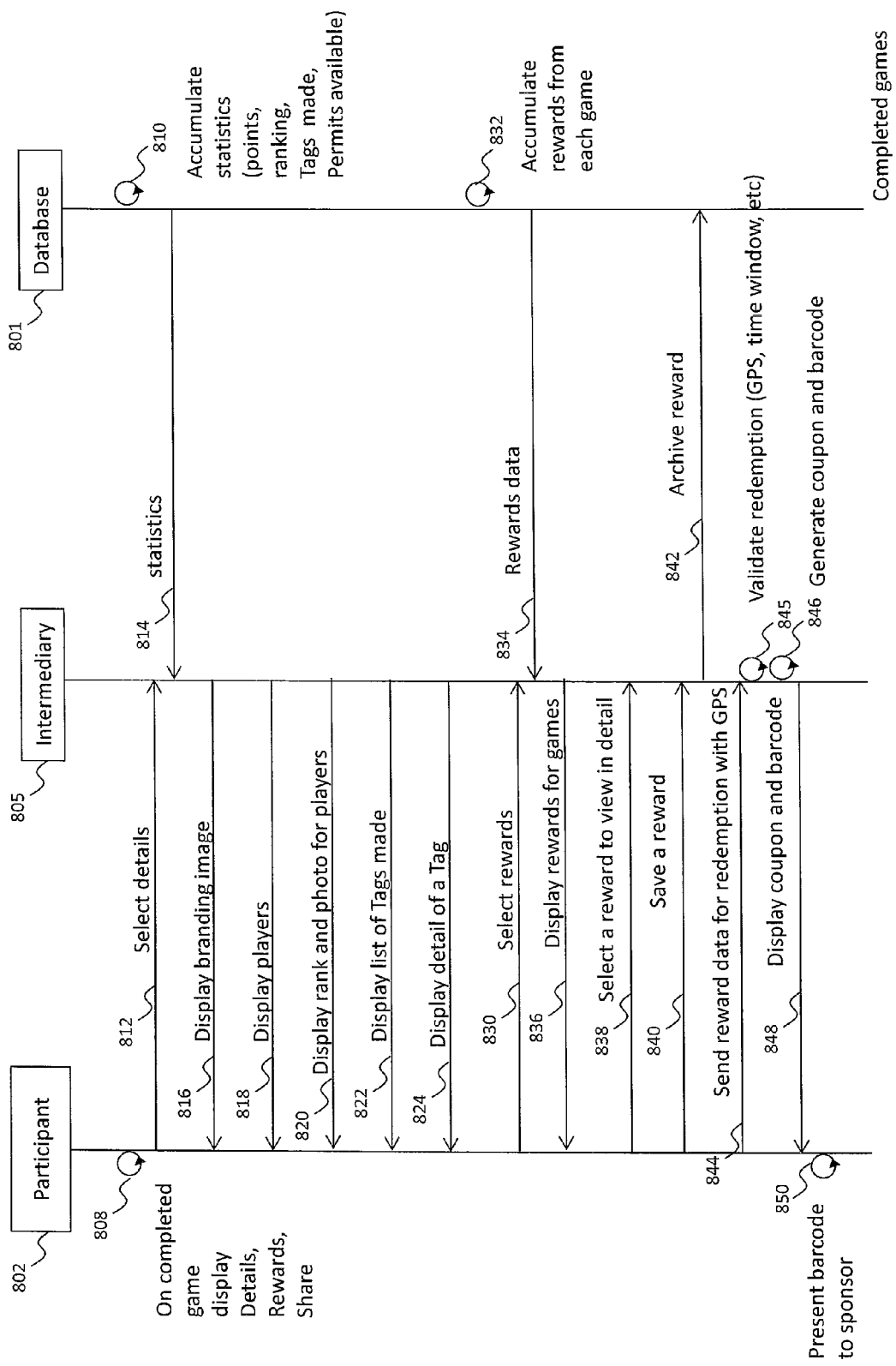
FIG. 8 is a sequence diagram of completed games interaction.

Referring to FIG. 8, a sequence diagram is disclosed for a method for managing completed games. The method involves intermediary 805 having a database 801 interacting with a participant 802. The method assumes that the participant has logged in with the intermediary and has selected to view completed games as in step 646. At step 808, participant 802, selects to display detailed completed game information for a completed game which includes the ability to get details about the completed game, redeem rewards from the completed game and share information about the completed game.

At step 810, the database accumulates information about all games as the complete, including statistical information such as points, ranking, "tags" made and unused permits. At step 812, the participant selects to view details about the completed game. At step 814, a set of statistics for the completed game is retrieved by the intermediary from the database and forwarded to the participant. At step 816, a branding image associated with the completed game is displayed for the participant. At step 818, a list of players who participated in the game is also displayed. At step 820, the ranking and a photo for each player in the list of players is also displayed. At step 822, a list of "tags made" by the participant is displayed for the participant, and if a "tag made" is further selected, then at step 824, details about that tag event is also displayed. For example, the target's photo is displayed.

At step 830, the participant selects to view rewards obtained during the completed game. At step 832, the database archives the rewards obtained by all the participants for each completed game. At step 834, the intermediary retrieves rewards data for the completed game and forwards the rewards data to the participant. At step 836, the participant displays the rewards data including a list of rewards.

At step 838, the participant selects a particular reward in the list of rewards to view in detail. At step 840, the participant selects to save the particular reward. Upon saving the particular reward, the intermediary, at step 842, archives the saved reward in the database for later retrieval by the intermediary and participant for redemption.

At step 844, the participant selects to immediately redeem the particular reward and reward data is sent to the intermediary along with the current GPS coordinates. At step 845, the reward is validated by checking a set of conditions designed with the reward by the sponsor including, but not limited to, a time window condition and a location condition. The participant's location (GPS) is checked to match a location condition. The time is checked to be in a matching time window for validity. If validated, then at step 846, the intermediary generates a coupon and a barcode. At step 848, the coupon and barcode are displayed by the participant. At step 850, the barcode is scanned to receive the reward, for example, a sponsor barcode scanner at a point of sale scans the barcode so the consumer can purchase an item using the coupon.

Figure 9:
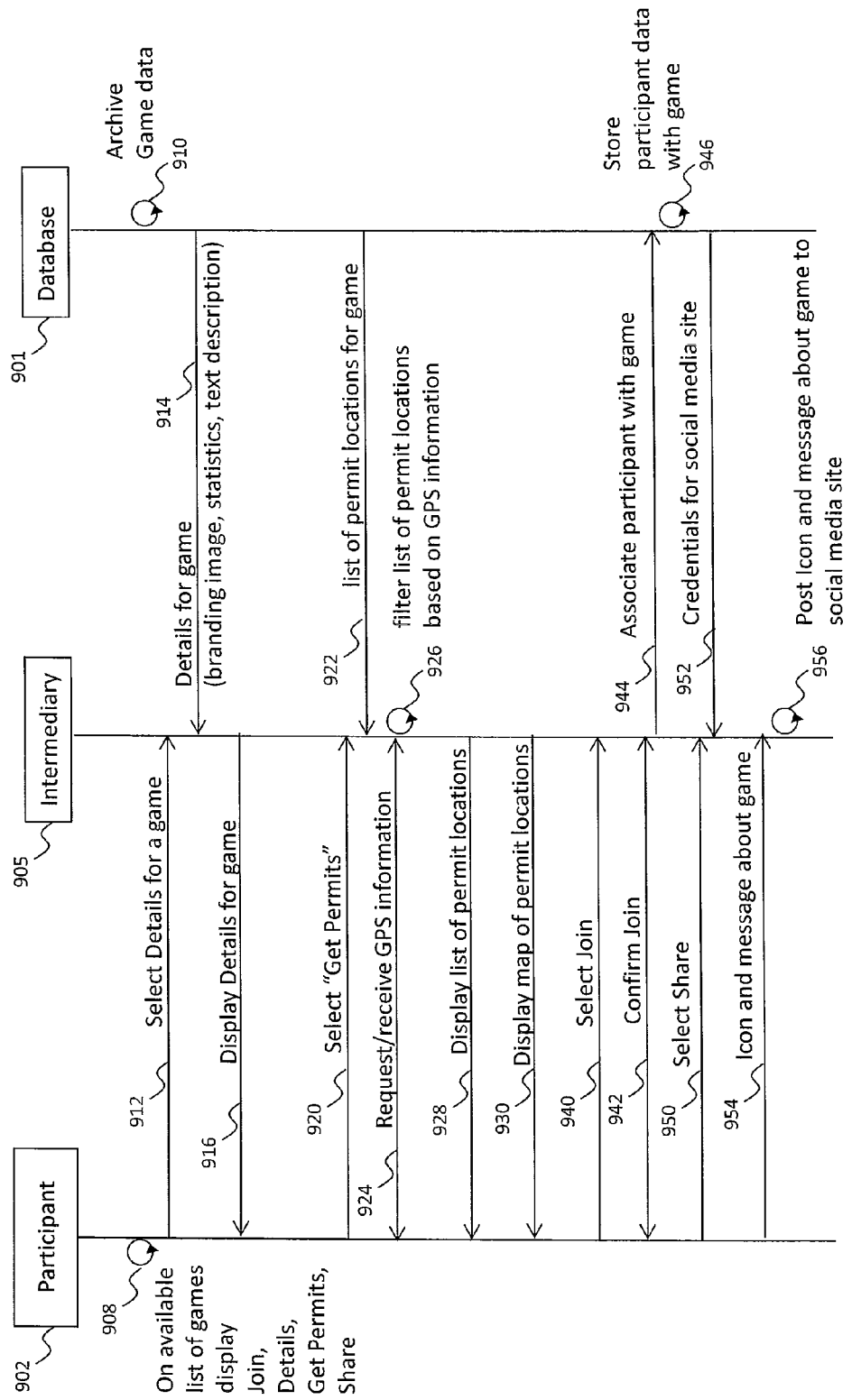
FIG. 9 is a sequence diagram of available games interaction including joining an available game.

Referring to FIG. 9, a sequence diagram is disclosed for a method for managing and joining available games. The method involves intermediary 905 having a database 901 and interacting with a participant 902. The method assumes that the participant has logged in with the intermediary and has selected to view available games as in step 652. At step 908, participant 902, selects to display detailed available game information for an available game which includes the ability to join the available game, obtain permits for the available game and share information about the available game.

At step 910, the database accumulates information about all available games as they are created and posted on a schedule by sponsors. At step 912, the participant selects to view details for an available game. At step 914, the intermediary retrieves details for the available game including a branding image, statistics and a text description. At step 916, the intermediary forwards the details of the available game to the participant for display.

At step 920, the participant selects to "get permits" for the available game. At step 922, the intermediary retrieves a list of permit locations for the available game. At step 924, the intermediary requests and receives GPS coordinate information from the participant. At step 926, the intermediary filters the list of permit locations based on the GPS coordinate information, sorting the list in order of proximity to the participant. At step 928, the list of permit locations is displayed for the participant and an option to view a map of the permit locations is provided. If the participant chooses to do so, at step 930, a map of the permit locations is displayed for the participant. Additional information can be included with the list of permit locations, such as the number of permits available per location, time limits and any other restrictions that may apply in order to obtain permits.

At step 940, the participant selects to join the available game. At step 940, the participant can enter any requested participant information, enter special codes that provide additional upfront permits from a reward, or a code that causes them to join a team in a team based game as described below. At step 942, a confirmation of participation is sent. At step 944, the intermediary associates the participant with the available game and at step 946, participant information is stored with the available game.

At step 950, the participant selects to share the available game with another participant, for example, to encourage another participant to join alongside them in the game. At step 952, the intermediary retrieves the set of credentials for social media sites to which the participant is connected. At step 954, the participant creates an invitation message to join the available game, including an icon or logo associated with the available game. The participant further selects a social media site and forwards the message to the intermediary. The intermediary, at step 956, then posts the invitation message to at least one selected social media site. The participant can also invite friends to join via email, text/SMS message invitations.

Further to the sharing of pending and available games, in another aspect of the disclosure, teams of participants can be formed. A particular game may include in its rules, that only teams can play the game, where the size and characteristics of the team may be specified. Thus, at steps 950, 952, 954 and 956, the application can be put into a "team" mode, whereby the invitations to join are configured with a code, that when shared and then used by the other participants during their join process, causes them to become part of a team. In team mode, the intermediary and the database accumulate team statistics, such as team "tags made," team points. Team permits can be obtained and shared among the team members.

Figure 10:
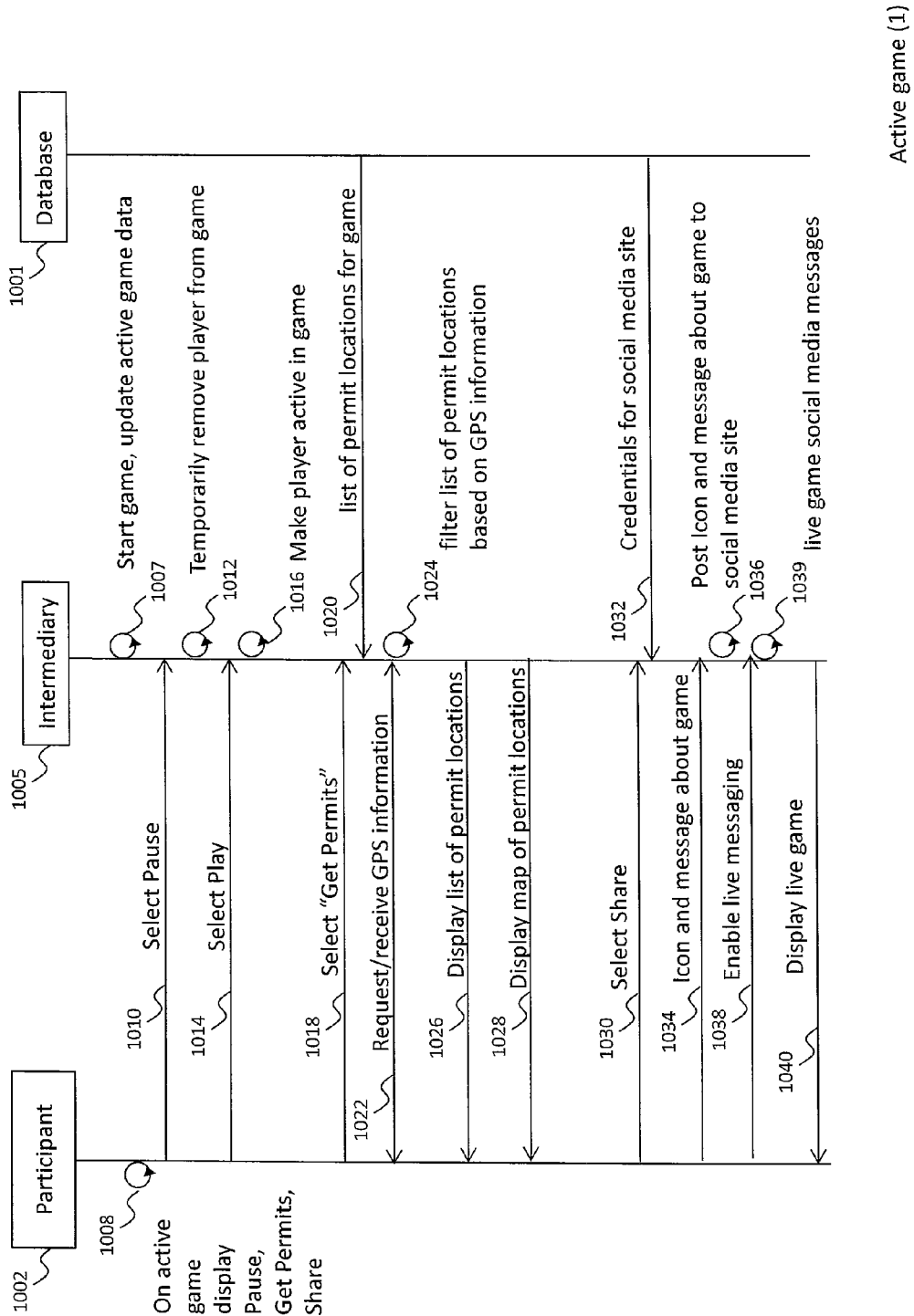
FIG. 10 is a sequence diagram of active game participation.

Referring to FIG. 10, a sequence diagram is disclosed for a method for participating in an active game. The method involves intermediary 1005 having a database 1001 and interacting with a participant 1002. The method assumes that the participant has logged in with the intermediary and has selected to view active games as in step 616. Also, at step 1007 the game is started by the intermediary, updating active game data until the game ends. At step 1008, participant 1002, selects to display detailed game information for an active game which includes the ability to pause their play in an active game, obtain permits for the active game and share information about the available game.

At step 1010, the participant selects to pause the active game. At step 1012, the intermediary temporarily removes the player from the game, freezing all of the players' statistics. At step 1014, the player selects to play in the active game. The intermediary, at step 1016, responds by making the player visible to other players and active in the game.

At step 1018, the participant selects to "get permits" for the active game. At step 1020, the intermediary retrieves a list of permit locations for the available game. At step 1022, the intermediary requests and receives GPS coordinate information from the participant. At step 1024, the intermediary filters the list of permit locations based on the GPS coordinate information, sorting the list in order of proximity to the participant. At step 1026, the list of permit locations is displayed for the participant and an option to view a map of the permit locations is provided. If the participant chooses to do so, at step 1028, a map of the permit locations is displayed for the participant. Additional information can be included with the list of permit locations, such as the number of permits available per location, time limits and any other restrictions that may apply in order to obtain permits.

At step 1030, the participant selects to share the active game with another participant, for example, to encourage another participant to join alongside them in the game. At step 1032, the intermediary retrieves the set of credentials for social media sites to which the participant is connected. At step 1034, the participant creates an invitation message about the active game, including an icon or logo associated with the available game. The intermediary, at step 1036, then posts the invitation message to at least one selected social media site or sends invitations via email or SMS/text message methods. At step 1038, the participant enables live game messaging where, at step 1039, social media messages are created by the intermediary and sent to the social media web site, along with tag event information, photos of participants, advertisements, logos, sign-up requests, voting opportunities and other content.

Figure 11:
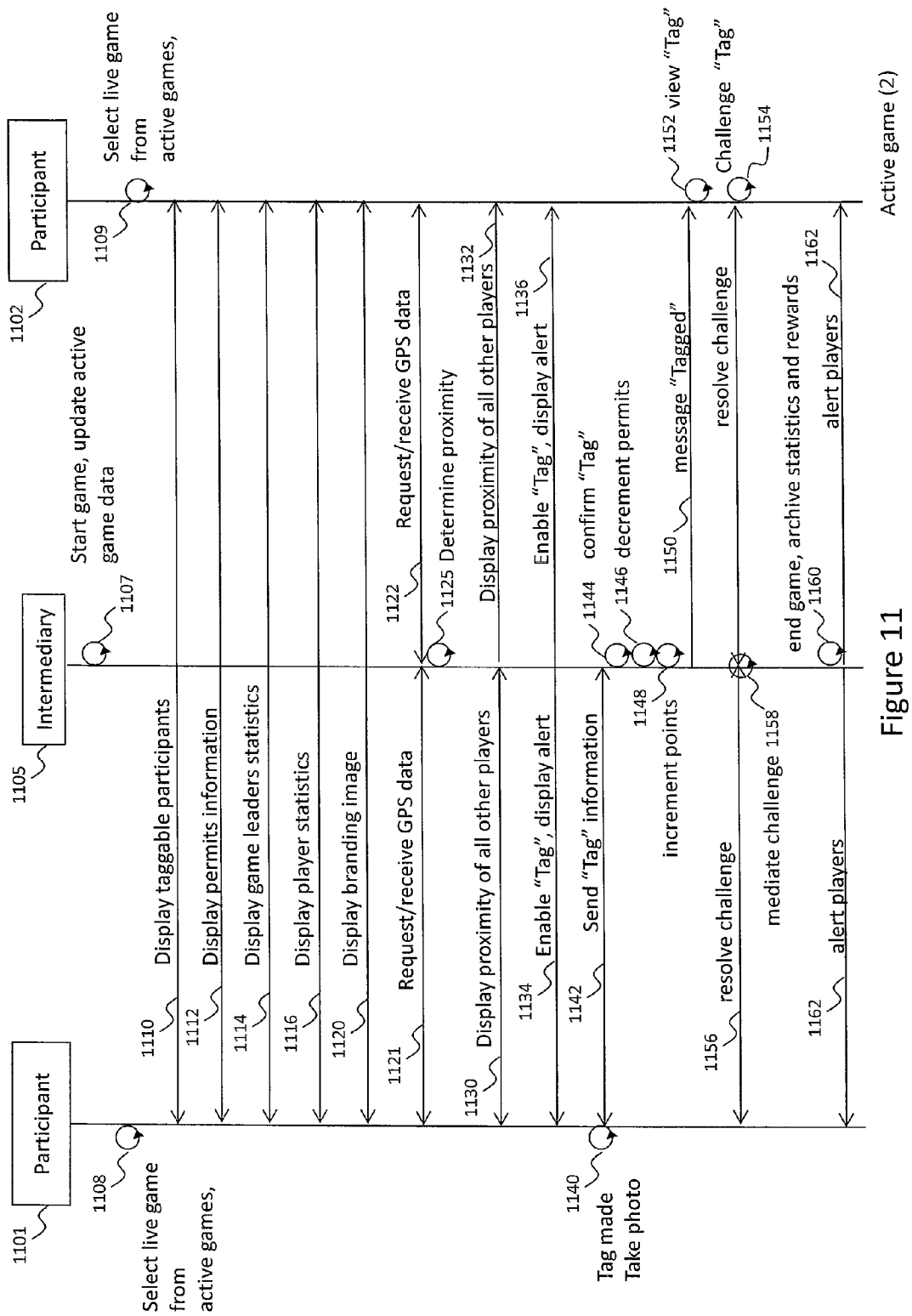
FIG. 11 is a sequence diagram of further active game participation.
Figure 12:
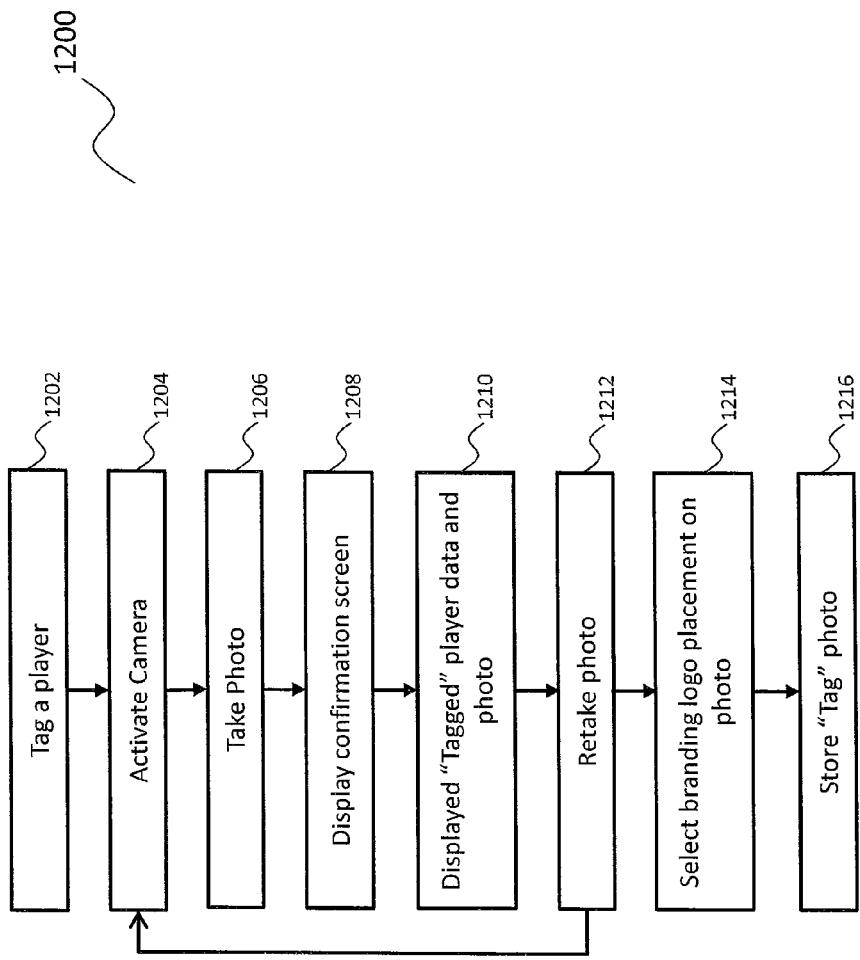
FIG. 12 is a flowchart of a preferred embodiment of confirming a tag.

At step 1040, the participant selects to display the live game, which starts another method on the application, as described in FIGS. 11 and 12.

In an alternate embodiment, step 1038 is enabled during the sign-up process for the application or during the process of joining an available game. For example, a sponsor may require the enablement in step 1038 in order to join an available game. In another example, the provider of the application may require the enablement of step 1038 in order to download and install the game on the consumer device, in addition to requiring that GPS subsystem be left on in order to play a game.

Referring to FIG. 11, a sequence diagram is disclosed for a method for playing a game. The method involves intermediary 1105 having a database (not shown) and interacting with a first participant 1101 and a second participant 1102. The method assumes that both participants have logged in with the intermediary and have selected to engage the live game as in step 1040. At step 1107, a game is started, making it a live game continuously updated with live game data and events. At step 1108, participant 1101 selects to engage in the live game. At step 1109, participant 1102 also selects to engage in the live game. Other participants may also be involved in the live game, but the actions of two participants suffice to show the game operation.

At step 1110, a set of taggable participants is shown on both devices. Although participant 1101 is not shown on his own device and the same for participant 1102.

At step 1112, permits information for participant 1101 is shown to participant 1101 and permits information for participant 1102 is shown to participant 1102.

At step 1114, game leader statistics is shown to both participants.

At step 1116, a set of player statistics is shown to both participants, including ranking, number of tags and number of points.

At step 1120, a branding image from the sponsor is displayed to both participants.

At step 1121, GPS location data is requested by the intermediary from participant 1101 and received. At step 1122, GPS location data is requested by the intermediary from participant 1102 and received. At step 1125, the intermediary determines the proximity of each participant to each and every other participant. At step 1130, the proximity of all the other participants to participant 1101 is displayed for participant 1101. At step 1132, the proximity of all the other participants to participant 1102 is displayed for participant 1102.

The participants generally change locations to put themselves into position to snap a picture of the other participants—based on the proximity information. At step 1134, when participant 1101 is within a certain distance of participant 1102, a "tag" capability (selectable button) is displayed (or changed color) for participant 1101 to indicate that participant 1102 is in "taggable" range. An alert to this effect is presented to participant 1101. The alert may be visual, audio or both visual and audio.

At step 1136, when participant 1102 is within a certain distance of participant 1101, the "tag" capability is displayed for participant 1102 to indicate that participant 1101 is in "taggable" range. An alert to this effect is presented to participant 1102.

At step 1140, a "tag" event occurs when participant 1101 makes a "tag" of participant 1102 by pressing the selectable "tag" button and documenting the "tag", for example, with a photo of participant 1102. At step 1142, "tag" information is communicated to the intermediary. At step 1144, the intermediary accepts the "tag" information and confirms the "tag". At step 1146, the number of permits available to participant 1101 is decremented and at step 1148, the number of points for participant 1101 is incremented, according to a "tag" value for the "tag" event as set by the game rules and any other dynamic rules (e.g., participant 1102 designated for bounty).

At step 1150, the intermediary transmits a message to participant 1102 with the information that participant 1102 has been tagged by participant 1101. The message includes the photo taken by participant 1101. At step 1152, participant 1102 views the message and the photo and if in dispute, at step 1154, challenges the "tag". For example, the "tag" may be in dispute if the photo is not of participant 1102 or if participant 1102 "tagged" participant 1101 at nearly the same time. At step 1156, a process to resolve the challenge takes place in an interaction between the intermediary, participant 1101 and participant 1102. In order to resolve disputes, at step 1158, the intermediary receives information about the challenge, sends queries to the participants regarding the challenge, examines timing of the "tag" and so forth as needed. It is also conceived that the intermediary may perform facial recognition on the photo in step 1144 to confirm the "tag" before forwarding the message to participant 1102 at step 1150 and utilize that information in resolving challenges. At steps 1156 and 1158, the intermediary and the two participants resolve the challenge. Facial recognition may also be used to identify players who may be in a "cloaked" state as participants.

At step 1160, the game ends by concluding a time window or by a particular event occurring in the game. For example, there may be a primary objective of "tagging" an object or person at an undisclosed location (undisclosed to the participants) while the participants are "tagging" one another. When the primary objective is met, the game is ended. At step 1162, all participants are alerted that the game is over and the intermediary tallies the results of the completed game including "tags" made, points achieved, permits expended, and so forth.

Referring to FIG. 12, a method 1200 for confirming a tag is shown. At step 1202, a player is tagged. In the preferred embodiment, the "tag" is initiated when the selectable "tag" button is pressed on a participant's device. At step 1204, a camera is activated on the participant's device. At step 1206, a photo is taken of the tagged player using the camera. At step 1208, a confirmation screen is displayed where at step 1210, the photo of the tagged player and a portion of his/her profile information is displayed. At step 1212, if the participant chooses, the photo can be retaken (if possible). At step 1214, a branding logo from a sponsor is presented for placement on the photo and the participant is required to place the branding logo before continuing the method. At step 1216, the "tag"

and "tag" photo are transmitted to the intermediary and stored in the database. In another embodiment, the intermediary may further confirm the "tag" before storing it in the database, for example, by facial recognition.

Figure 13:
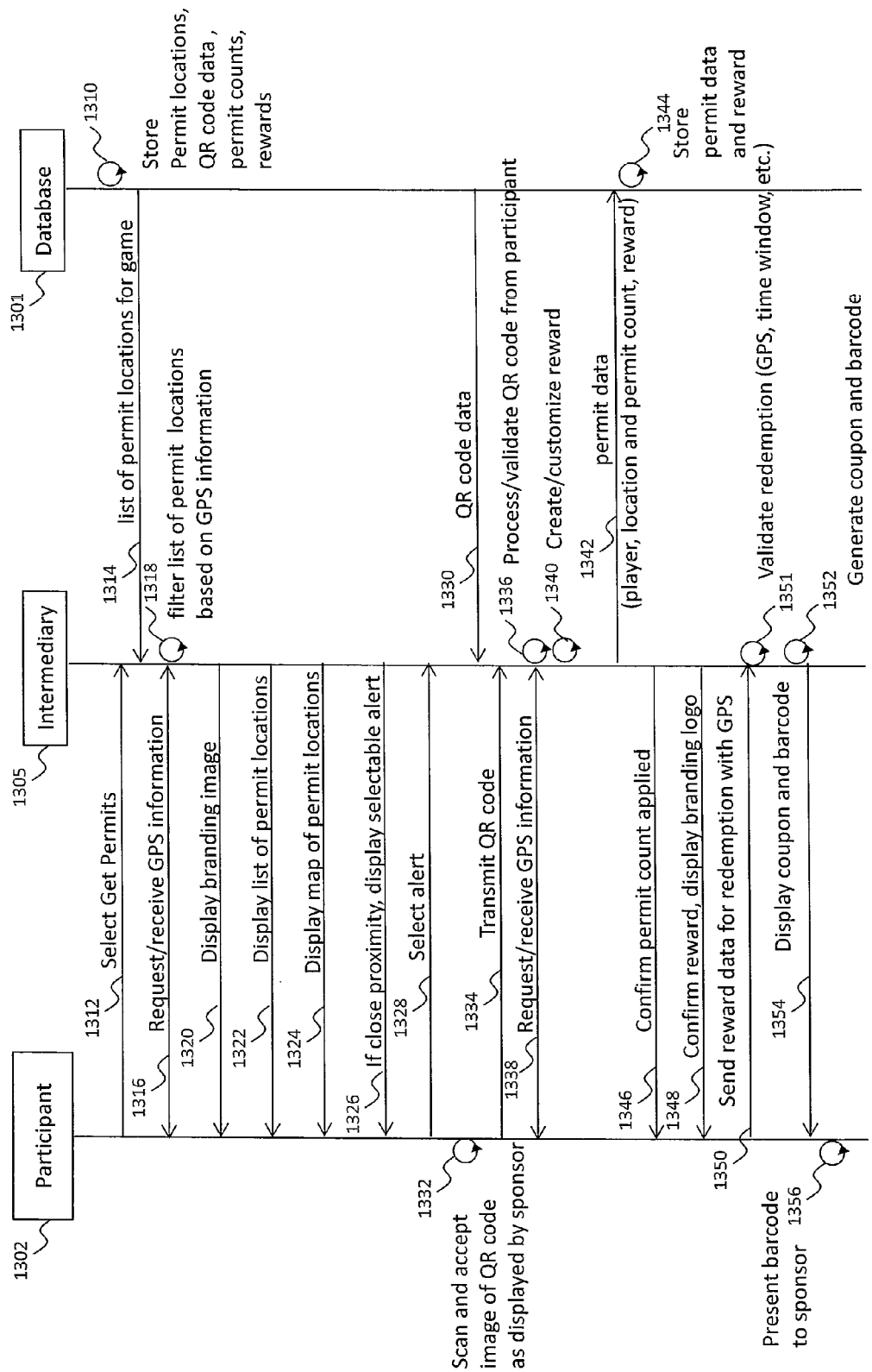
FIG. 13 is a sequence diagram of obtaining permits.

Referring to FIG. 13, a sequence diagram is disclosed for a method for obtaining permits. The method involves intermediary 1305 having a database 1301 and interacting with a participant 1302. The method assumes the participant has logged in with the intermediary and is selecting to engage to get permits as in step 716 of FIG. 7, step 920 of FIG. 9 and step 1018 of FIG. 10. At step 1310, a set of permit locations, QR, UPC or barcode data, permit counts at each location, and rewards associated with each location are stored in the database. This is typically done at the game design and advertising campaign steps of the process. In other embodiments, the permit data of step 1310 can be dynamic and change with time or with game variables.

At step 1312, the participant selects to "get permits" for a game. At step 1314, the intermediary retrieves a list of permit locations for the available game. At step 1316, the intermediary requests and receives GPS coordinate information from the participant. At step 1318, the intermediary filters the list of permit locations based on the GPS coordinate information, sorting the list in order of proximity to the participant. At step 1320, a branding image for a sponsor of the game is displayed for the participant. At step 1322, the list of permit locations is displayed adjacent the branding image and an option to view a map of the permit locations is provided. At step 1324, a map of the permit locations is displayed. In the preferred embodiment, the participant can switch between a map view and a list view of the permit locations.

At step 1326, for those permit locations that are in close proximity a selectable alert is displayed. Close proximity is defined as within close enough distance to validate the permit. The steps that follow validate the permit.

At step 1328, the selectable alert is selected and a camera is activated on the participant device. At step 1330, a QR, UPC or barcode data is displayed by a sponsor at a location and associated with the permit location in the database. At step 1332, an image of the QR, bar or UPC code is scanned by the camera and displayed for the participant to accept. Once accepted, at step 1334, the image of the QR code is transmitted to the intermediary. At step 1336, the intermediary requests and receives GPS coordinate information from the participant.

At step 1338, the intermediary processes the QR code and validates for being collocated with the participant in the correct time window. A granted permit is created with permit data including the participant, the location, a permit count, an associated game, and a reward if available. If a reward is available for this permit location, at step 1340, the reward is customized for the participant. At step 1342, permit data for the granted permit is transmitted to the database and at step 1344 stored in the database with the participants information.

At step 1346, a permit confirmation is sent to the participant. If a reward is available, then at step 1348 the reward is sent to the participant and made available for immediate redemption. A branding logo for the sponsor is included with the reward.

At step 1350, the participant selects to immediately redeem the particular reward and reward data is sent to the intermediary along with the current GPS coordinates. At step 1351, the reward is validated by checking a set of conditions designed with the reward by the sponsor including a time window condition and a location condition. The participant's location (GPS) is checked to match a location condition. The time is checked to be in a matching time window for validity. If validated, then at step 1352, the intermediary generates a coupon and a barcode. At step 1354, the coupon and barcode are displayed by the participant. At step 1356, the barcode is scanned to receive the reward, for example, a sponsor barcode scanner at a point of sale scans the barcode so the consumer can purchase an item using the coupon.

The method of FIG. 13 uses a QR code combined with GPS coordinates of the participant for validating the collocation of the participant at a sponsor location. There are many other possible means of collocation that are suitable. For example, a UPC code combined with the GPS coordinates, a bar code combined with GPS coordinates, or a picture of a unique object known to be at the sponsor location combined with GPS coordinates.

The embodiments presented in this disclosure are intended to provide implementable examples of the present invention, but are not intended to limit the present invention. For instance, the consumers may interact with their gaming information through a web interface on a non-portable computer; however, the physical gaming functions of "tagging" would obviously not be enabled. On the other hand, a consumer may interact with multiple games at one time through their special interface, simultaneously obtaining all of the information and functionality for each and every game as described herein. Furthermore, it should be understood that the intermediary can be hidden, in the sense that the participants need not be aware that data is flowing to and from the intermediary, particularly while authenticating. The nature of the rewards, coupons, game rules, number of sponsors involved in a game and number of participants involved in a game, among other such details presented in the example embodiments and disclosed here, is not limited by this disclosure.

The invention claimed is:

1. In a system of a network, a participant device, a target device and an intermediary device, all connected to the network, a method for providing an advertisement game comprising:
when the participant device and the target device become collocated, sending a message from the intermediary device to the participant device advising of a proximity to the target device;
receiving, by the intermediary device from the participant device, a picture linked with a target that is associated with the target device by a tag;
confirming the tag by the intermediary device;
sending an acknowledgement of the tag to the target device by the intermediary device;
wherein the participant device is one of a phone and a tablet; and,
wherein the target device is one of a phone and a tablet.

2. The method of claim 1 further comprising the step of:
sending an advertisement to the participant device by the intermediary device.

3. The method of claim 1 further comprising the step of:
sending an advertisement to the target device by the intermediary device.

4. The method of claim 1 wherein becoming collocated comprises the steps of:
receiving a first set of geographic location data from the participant device by the intermediary device;
receiving a second set of geographic location data from the target device by the intermediary device; and,
comparing the first set of geographic location data to the second set of geographic location data by the intermediary device.

5. The method of claim 1 further comprising the steps of:
providing a permit by the intermediary device; and,
allowing the tag based on the permit.

6. The method of claim 1 further comprising the steps of:
providing permit data to the participant device and to the target device by the intermediary device; and,
receiving reward data that is based on the permit data from the participant device by the intermediary device.

7. The method of claim 1 further comprising the steps of:
determining a winner based on the tag by the intermediary device; and,
rewarding the winner by sending reward data to the participant device by the intermediary device.

8. The system of claim 1 further comprising a recipient device connected to the network, and the method further comprising the step of:
syndicating the advertisement game to the recipient device by the intermediary device; and,
wherein the recipient device is one of a phone and a tablet.

9. A method for a mobile game carried out by a mobile game server, comprising the steps of:
storing, by the mobile game server, a set of game rules for the mobile game;
storing, by the mobile game server, a set of sponsor advertisements and a set of rewards for the mobile game;
receiving, by the mobile game server, registration of a set of participants and a set of mobile devices associated with the set of participants;
executing, by the mobile game server, the mobile game according to the set of game rules;
communicating, by the mobile game server, the set of sponsor advertisements to the set of mobile devices;
when a first mobile device of a first participant of the set of participants and a second mobile device of a second participant of the set of participants are collocated, receiving, by the mobile game server, a tag event that includes a digital image from the first mobile device;
confirming, by the mobile game server, the digital image to be an image of the second participant;
determining by the mobile game server, a winner based on the tag event;
sending, by the mobile game server, a reward of the set of rewards to a mobile device of the winner; and,
wherein each mobile device is one of a phone and a tablet.

10. The method of claim 9 wherein the step of collocating further comprises:
receiving, by the mobile game server from the first mobile device, a first set of geographic location data;
receiving, by the mobile game server from the second mobile device, a second set of geographic location data; and,
comparing, by the mobile game server, the first set of geographic location data to the second set of geographic location data.

11. The method of claim 9 wherein the step of collocating further comprises the step of collocating a plurality of mobile devices of the set of mobile devices and of a plurality of participants of the set of participants.

12. The method of claim 9 wherein the step of confirming is performed by the steps of:
receiving, by the mobile game server from the first mobile device, an initial image of the second participant; and,
comparing, by the mobile game server, the digital image to the initial image to determine a match.

13. The method of claim 9 wherein the step of confirming is performed by facial recognition by the mobile game server.

14. The method of claim 9 further comprising the steps of:
allowing, by the mobile game server, the first participant to collect a permit; and,
allowing, by the mobile game server, the tag event based on the permit.

15. The method of claim 14 further comprising the step of sending, by the mobile game server to a mobile device of the first participant, reward data to reward the first participant based on the permit.

16. The method of claim 9 wherein the step of determining the winner further comprises sending, by the mobile game server to mobile devices of a subset of participants of the set of participants, reward data rewarding the subset of participants by a plurality of tag events.

17. A mobile game system for conducting a mobile game between a set of participants associated with a set of mobile devices connected to a network comprising:
a mobile game server connected to the network;
a set of mobile game parameters;
the mobile game server further comprising a processor executing a set of programmed instructions which cause the processor to:
register, by the mobile game server, the set of participants;
initialize, by the mobile game server, the set of mobile game parameters;
transmit, by the mobile game server, the set of mobile game parameters to the set of mobile devices;
collocate, by the mobile game server, the set of participants;
receive, by the mobile game server, a set of game information from the set of mobile devices; and,
deliver, by the mobile game server, a reward to a participant of the set of participants based on the set of game information;
wherein each mobile device is one of a phone and a tablet.

18. The system of claim 17 wherein the set of game information further comprises:
a tag; and,
a tag confirmation.

19. The system of claim 18 wherein the set of programmed instructions further include instructions which cause the processor to:
send, by the mobile game server, an advertisement to a mobile device of the set of mobile devices based on the set of game information.

20. The system of claim 17 wherein the set of programmed instructions further include instructions which cause the processor to:
facilitate, by the mobile game server, syndication of the mobile game.

21. The system of claim 20 wherein the step of facilitating is conducted by the mobile game server through a social media interface.

22. The system of claim 17 wherein the set of mobile game parameters further comprises:
a set of execution rules for the mobile game; and,
an appearance of the mobile game.

23. The system of claim 17 wherein the set of programmed instructions further include instructions which cause the processor to:
assign, by the mobile game server, a set of points to each participant of the set of participants based on the set of game information;
determine, by the mobile game server, a rank for each participant of the set of participants based on the set of points; and, determine, by the mobile game server, the set of rewards based on at least one of the group consisting of the rank and the set of points.

\* \* \* \* \*